United States Patent
Butler et al.

(10) Patent No.: US 12,437,028 B2
(45) Date of Patent: Oct. 7, 2025

(54) SYSTEMS, SOFTWARE AND METHODS FOR GENERATING TRAINING DATASETS FOR MACHINE LEARNING APPLICATIONS

(71) Applicant: The Salk Institute for Biological Studies, La Jolla, CA (US)

(72) Inventors: Daniel Jaffe Butler, La Jolla, CA (US); Eiman Azim, La Jolla, CA (US); Alexander Keim, La Jolla, CA (US)

(73) Assignee: THE SALK INSTITUE FOR BIOLOGICAL STUDIES, La Jolla, CA (US)

( * ) Notice: Subject to any disclaimer, the term of this patent is extended or adjusted under 35 U.S.C. 154(b) by 639 days.

(21) Appl. No.: 17/503,116

(22) Filed: Oct. 15, 2021

(65) Prior Publication Data
US 2022/0121878 A1   Apr. 21, 2022

Related U.S. Application Data

(60) Provisional application No. 63/092,841, filed on Oct. 16, 2020.

(51) Int. Cl.
*G06K 9/00* (2022.01)
*G06F 18/214* (2023.01)
(Continued)

(52) U.S. Cl.
CPC ............ *G06F 18/214* (2023.01); *G06F 18/24* (2023.01); *G06V 10/255* (2022.01)

(58) Field of Classification Search
CPC ........ G01N 21/6428; G01N 2021/6439; G06T 2207/20081; G06T 7/33; G16B 40/30;
(Continued)

(56) References Cited

U.S. PATENT DOCUMENTS 10,935,773 B2 *  3/2021  Johnson ............... G02B 21/008
10,949,986 B1 *  3/2021  Colmenares ........... H04N 23/56
(Continued)

OTHER PUBLICATIONS

S. Prasad and S. Sinha, "Real-time object detection and tracking in an unknown environment," 2011 World Congress on Information and Communication Technologies, Mumbai, India, 2011, pp. 1056-1061, doi: 10.1109/WICT.2011.6141394. (Year: 2011).*

Peikon, I. D., Fitzsimmons, N. A., Lebedev, M. A., & Nicolelis, M. A. (2009). Three-dimensional, automated, real-time video system for tracking limb motion in brain-machine interface studies. Journal of neuroscience methods, 180(2), 224-233. (Year: 2009).*

(Continued)

*Primary Examiner* — Gregory A Morse
*Assistant Examiner* — Kevin M Coomber
(74) *Attorney, Agent, or Firm* — NORTON ROSE FULBRIGHT US LLP

(57) ABSTRACT

Described herein are systems, software, and methods for generating training datasets for machine learning (ML) applications. The systems, software, and methods generally operate by obtaining first and second pluralities of images of a subject bearing as associated imaging label, identifying locations of the imaging label within the first plurality of images, and using the identified locations to generate a plurality of labeled images based upon the second plurality of images. In this manner, a large collection of labeled images may be collected without the need for manual labeling by a human actor. This large collection of labeled images may then form the training set for training a ML system.

15 Claims, 23 Drawing Sheets

(51) Int. Cl.
*G06F 18/24* (2023.01)
*G06V 10/20* (2022.01)

(58) Field of Classification Search
CPC .... G05D 1/0088; G06V 10/778; G06V 10/82; G06V 10/255; G06V 40/193; G06V 10/774; G06F 18/24; G06F 18/24147; G06F 18/214
See application file for complete search history.

(56) References Cited

U.S. PATENT DOCUMENTS

| | | | |
|---|---|---|---|
| 2008/0219511 A1* | 9/2008 | Nakajima | G02B 21/365 382/110 |
| 2011/0210915 A1* | 9/2011 | Shotton | G06V 40/103 345/157 |
| 2015/0131868 A1* | 5/2015 | Rooyakkers | G06F 16/5866 382/110 |
| 2020/0117953 A1* | 4/2020 | Cooper | G06V 10/772 |
| 2022/0309678 A1* | 9/2022 | Koch | G06T 7/0016 |
| 2023/0206469 A1* | 6/2023 | Morris | G06T 7/74 382/157 |

OTHER PUBLICATIONS

Bartoo, G. T., & Hanson, W. A. (Nov. 1989). Multi-modality image registration using centroid mapping. In Images of the Twenty-First Century. Proceedings of the Annual International Engineering in Medicine and Biology Society, (pp. 550-551). IEEE. (Year: 1989).*
Azim et al., "Skilled reaching relies on a V2a propriospinal internal copy circuit," Nature, 2014, 508(7496), 357-363.
Ghosh et al., "Miniaturized integration of a fluorescence microscope," Nature Methods, 2011, 8(10), 871-878.
Hong et al., "Automated measurement of mouse social behaviors using depth sensing, video tracking, and machine learning," Proceedings of the National Academy of Sciences, 2015, 112(38), E5351-E5360.
Machado et al., "A quantitative framework for whole-body coordination reveals specific deficits in freely walking ataxic mice," eLife, 2015, 4, e07892.
Mathis et al. "DeepLabCut: markerless pose estimation of user-defined body parts with deep learning." Nature Neuroscience, 2018, vol. 21, 1281-1289.
Zhu et al., "Unpaired Image-to-Image Translation using Cycle-Consistent Adversarial Networks," arxiv, 2017, 18 pages.

* cited by examiner

SYSTEMS, SOFTWARE AND METHODS FOR GENERATING TRAINING DATASETS FOR MACHINE LEARNING APPLICATIONS

CROSS-REFERENCE

The present application claims priority to U.S. Provisional Application No. 63/092,841, filed on Oct. 16, 2020, entitled "SYSTEMS, SOFTWARE AND METHODS FOR GENERATING TRAINING DATASETS FOR MACHINE LEARNING APPLICATIONS," which is herein incorporated by reference in its entirety for all purposes.

BACKGROUND

The embodiments disclosed herein are generally directed towards systems, software, and methods for generating training datasets for machine learning applications.

Artificial intelligence (AI) systems and methods, such as machine learning (ML), deep learning (DL), and reinforcement learning (RL), have made great progress in automating tasks in fields ranging from computer vision (CV) to natural language processing (NLP). In particular, supervised learning methods have achieved great success. However, such methods have typically required training an AI system using a very large dataset comprising hundreds of thousands or millions of data points (such as images or sounds). Each of these data points is typically labeled with information detailing its contents. For instance, an image may be labeled with one or more bounding boxes indicating where features of interest are located within the image. This labeling is typically done manually by a human and is therefore extremely labor-intensive. Thus, manual labeling often consumes a large majority of the effort required to train an AI system.

In behavioral studies, the ability to capture and quantify animal movement has long been central to studying animal behavior. Such movement is often analyzed by tracking landmarks on the animal (such as one or more limbs of the animal) and estimating the animal's pose from those landmarks. Marker-based solutions may afford high accuracy but can interfere with behavior, do not scale to more than a few tracking locations, and complicate experimental procedures. Recent advances in machine learning-based markerless pose estimation have improved the scale and ease with which landmarks can be tracked in studies of animal behavior. However, pose estimation for animals in a laboratory setting still faces some unique challenges: researchers typically manually generate new labels (e.g., approximately 500-100 labels) for each new experimental setup (e.g., for differing camera angles, lighting conditions, behavioral assays, etc.), limiting the generalizability of this approach. Furthermore, each lab typically trains their own landmark trackers from scratch—the lack of a "one-size-fits-all" kinematic tracker means that different labs typically track different anatomical landmarks and analyze the resulting kinematic data in idiosyncratic ways.

Evidently, there is an imminent need for systems and methods for generating training datasets that do not require large amounts of manual labeling.

SUMMARY

The present disclosure provides systems and methods for generating training datasets that do not require large amounts of manual labeling.

In an aspect, the present disclosure provides a method comprising: a) obtaining a first plurality of images of at least one subject using a first imaging modality, the first plurality of images comprising at least one parameter, the subject having at least one imaging label associated therewith; b) obtaining a second plurality of images of the at least one subject using a second imaging modality different from the first imaging modality; and c) generating a plurality of labeled images for use in a supervised machine learning (ML) operation using the at least one parameter. In various embodiments, the at least one subject comprises at least one animal. In various embodiments, the at least one imaging label comprises at least one fluorescent imaging label. In various embodiments, the at least one imaging label comprises a plurality of imaging labels. In various embodiments, the plurality of imaging labels are associated with a plurality of physiological locations on the subject. In various embodiments, the method further comprises associating the at least one imaging label with the at least one subject. In various embodiments, the first imaging modality comprises a fluorescence imaging modality. In various embodiments, the second imaging modality comprises a visible light imaging modality. In various embodiments, the visible light imaging modality comprises a brightfield imaging modality. In various embodiments, the first plurality of images and the second plurality of images are obtained in an interlaced manner. In various embodiments, the at least one parameter comprises a region of interest on the subject. In various embodiments, the method further comprises computing a centroid for each of the first plurality of images. In various embodiments, the method further comprises performing one or more data augmentation operations to the plurality of labeled images. In various embodiments, the one or more data augmentation operations are selected from the group consisting of: blurring, Gaussian blurring, contrast scaling, random contrast scaling, additive noise addition, Gaussian additive noise addition, channel scaling, random channel scaling, cropping, random cropping, affine warping, random affine warping, grayscale conversion, and probabilistic grayscale conversion. In various embodiments, the method further comprises training the supervised ML operation using the plurality of labeled images. In various embodiments, the plurality of labeled images is generated at a rate of at least 1 labeled image per second. In various embodiments, the method further comprises applying the supervised ML operation to a third plurality of images.

In another aspect, the present disclosure provides a system comprising: a) a first imaging module configured to obtain a first plurality of images of at least one subject using a first imaging modality, the subject having at least one imaging label associated therewith; b) a second imaging module configured to obtain a second plurality of images of the at least one subject using a second imaging modality different from the first imaging modality; and c) a label-generating module configured to generate a plurality of labeled images for use in a supervised ML operation using the at least one parameter. In various embodiments, the label-generating module comprises: i) one or more processors; and ii) a memory coupled to the one or more processors and configured to provide the one or more processors with instructions that, when executed, cause the one or more processors to generate the plurality of labeled images for use in the supervised ML operation. In various embodiments, the label-generating module comprises: i) one or more processors configured to generate the plurality of labeled images for use in the supervised ML operation; and ii) a memory coupled to the one or more processors and configured to provide the processor with instructions to generate the plurality of labeled images. In various embodiments, the at least one subject comprises at least one animal. In various embodiments, the at least one imaging label comprises at least one fluorescent imaging label. In various embodiments, the at least one imaging label comprises a plurality of imaging labels. In various embodiments, the plurality of imaging labels are associated with a plurality of physiological locations on the subject. In various embodiments, the label generating module is configured to associate the at least one imaging label with the at least one subject. In various embodiments, the first imaging modality comprises a fluorescence imaging modality. In various embodiments, the second imaging modality comprises a visible light imaging modality. In various embodiments, the visible light imaging modality comprises a brightfield imaging modality. In various embodiments, the first plurality of images and the second plurality of images are obtained in an interlaced manner. In various embodiments, the at least one parameter comprises a region of interest on the subject. In various embodiments, the label-generating module is configured to compute a centroid for each of the first plurality of images. In various embodiments, the label-generating module is configured to perform one or more data augmentation operations to the plurality of labeled images. In various embodiments, the one or more data augmentation operations are selected from the group consisting of: blurring, Gaussian blurring, contrast scaling, random contrast scaling, additive noise addition, Gaussian additive noise addition, channel scaling, random channel scaling, cropping, random cropping, affine warping, random affine warping, grayscale conversion, and probabilistic grayscale conversion. In various embodiments, the system further comprises a training module configured to train the supervised ML operation using the plurality of labeled images. In various embodiments, the plurality of labeled images is generated at a rate of at least 1 labeled image per second. In various embodiments, the system further comprises an inference module configured to apply the supervised ML operation to a third plurality of images.

In another aspect, the present disclosure provides a non-transitory computer-readable medium storing computer instructions that, when executed by a computer, cause the computer to perform a method comprising: a) obtaining a first plurality of images of at least one subject using a first imaging modality, the first plurality of images comprising at least one parameter, the subject having at least one imaging label associated therewith; b) obtaining a second plurality of images of the at least one subject using a second imaging modality different from the first imaging modality; and c) generating a plurality of labeled images for use in a supervised machine learning (ML) operation using the at least one parameter. In various embodiments, the at least one subject comprises at least one animal. In various embodiments, the at least one imaging label comprises at least one fluorescent imaging label. In various embodiments, the at least one imaging label comprises a plurality of imaging labels. In various embodiments, the plurality of imaging labels are associated with a plurality of physiological locations on the subject. In various embodiments, the method further comprises associating the at least one imaging label with the at least one subject. In various embodiments, the first imaging modality comprises a fluorescence imaging modality. In various embodiments, the second imaging modality comprises a visible light imaging modality. In various embodiments, the visible light imaging modality comprises a brightfield imaging modality. In various embodiments, the first plurality of images and the second plurality of images are obtained in an interlaced manner. In various embodiments, the at least one parameter comprises a region of interest on the subject. In various embodiments, the method further comprises computing a centroid for each of the first plurality of images. In various embodiments, the method further comprises performing one or more data augmentation operations to the plurality of labeled images. In various embodiments, the one or more data augmentation operations are selected from the group consisting of: blurring, Gaussian blurring, contrast scaling, random contrast scaling, additive noise addition, Gaussian additive noise addition, channel scaling, random channel scaling, cropping, random cropping, affine warping, random affine warping, grayscale conversion, and probabilistic grayscale conversion. In various embodiments, the method further comprises training the supervised ML operation using the plurality of labeled images. In various embodiments, the plurality of labeled images is generated at a rate of at least 1 labeled image per second. In various embodiments, the method further comprises applying the supervised ML operation to a third plurality of images.

Figure 1:
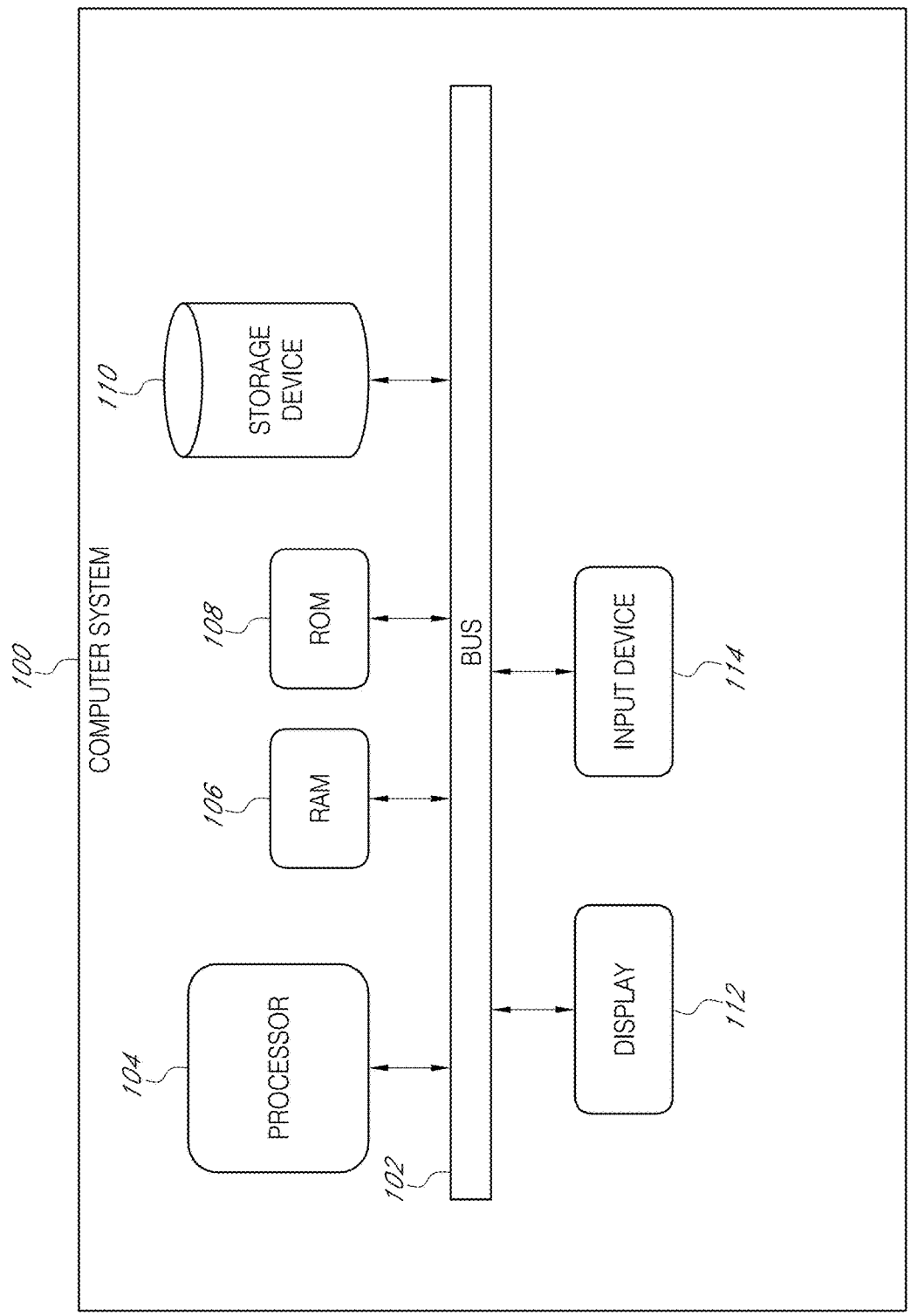
FIG. 1 is a block diagram illustrating a computer system configured to generate training datasets for machine learning (ML) applications, in accordance with various embodiments.

In various embodiments, not all of the depicted components in each figure may be required, and various embodiments may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

This specification describes various exemplary embodiments of systems, software, and methods for generating training datasets for machine learning (ML) applications.

How an animal's nervous system produces complex, skilled movement remains only partially understood. For instance, the seemingly simple process of reaching out to grasp a morsel of food is known to involve contributions from areas of the nervous system as diverse as the cerebral cortex, basal ganglia, cerebellum, and spinal cord, but the details of how these systems interact and cooperate to produce the behavior are not fully known. A better understanding of this process could have wide-ranging implications for both medicine and engineering, potentially leading to treatments for movement disorders, better prostheses, and robots with unprecedented dexterity.

However, one of the key challenges involved in studying the neural basis of complex movement is simply measuring movement in the first place. As techniques for measuring the electrical activity of neurons have improved dramatically, the technology for correlating animal movement with that neural activity has not always progressed apace.

Historically, movement studies have relied on a wide variety of measurement techniques. The most basic technique is qualitative observation: the investigator watches the movement under study and describes what they see. This approach may have the advantages of not impinging on the animal's behavior while also allowing the human observer to bring their judgement to bear on what aspects of movement are significant. However, qualitative observation may introduce limitations and biases into the measurement process: the observer may not have the ability to discern subtle features of movement or may unwittingly fail to record the features relevant to the experiment they are performing.

An important addition to the investigator's toolbox was the introduction of marker-based tracking. In this technique, markers are attached to the animal and their positions in space are computed from images collected by video cameras. Marker-based approaches may afford high accuracy but may have a number of drawbacks. Some animals may not tolerate markers well, and particularly with smaller animals like rodents, it may be difficult to track a large number of small features, such as the digits. Furthermore, by only tracking markers defined a priori by the investigator, much of the movement data may be discarded as unmarked regions may not be tracked.

More recently, markerless tracking approaches have become widespread in the wake of modern advances in computer vision and deep learning. These markerless tracking systems generally adhere to the following workflow: (1) landmarks are manually labeled in a subset of captured video frames; (2) based on these labeled frames, a neural network is trained to predict landmark positions from raw (unlabeled) image data; (3) the neural network is used to predict landmark positions in the raw (unlabeled) video frames from the same video dataset; (4) the experimenter verifies the labels produced by the neural network; and (5) if errors are sufficiently rare, the procedure is concluded; otherwise more frames are labeled at step (1) and the procedure is repeated until the errors are sufficiently rare.

Markerless tracking based on this workflow may produce highly accurate results, sometimes even with fewer than 1,000 labeled training images. The workflow may be applied post-hoc to video data that was collected without any specific tracking system in place at the time, which may make it possible to track wildlife in their natural habitats.

However, the markerless tracking workflow described above still faces challenges that may prevent its easy adoption by a large number of laboratories. The workflow may require researchers to perform a significant amount of labor by manually generating new labels (e.g., approximately 500-100 labels). This process may need to be repeated for each new experimental setup (e.g., for differing camera angles, lighting conditions, behavioral assays, etc.) in order to attain acceptable accuracies using the neural networks. This need to repeat the tedious manual labeling procedure for each change in experimental setup may limit the generalizability of such a workflow. Moreover, each lab may be required to train their own landmark trackers from scratch. This lack of a "one-size-fits-all" kinematic tracker may mean that different laboratories track different anatomical landmarks and analyze the resulting kinematic data in idiosyncratic ways. Thus, there is a need for systems and methods for generating training datasets that do not require large amounts of manual labeling.

The systems, software, and methods described herein present a new approach to training once-and-for-all neural networks that can be used in different contexts, making experiments easier to conduct and results easier to compare across a variety of experimental setups. Ultimately, a neural network is only as good as the quality and amount of data used to train it. The systems, software, and methods therefore create training data sets of sufficient size and diversity to train more versatile neural networks. Rather than rely on large-scale manual labeling, which can be cost-prohibitive and error-prone, the systems, software, and methods generate vast amounts of training data while reducing or completely avoiding the need for manual labeling of video frames.

The systems, software, and methods generally operate by obtaining first and second pluralities of images of a subject bearing as associated imaging label, identifying locations of the imaging label within the first plurality of images, and using the identified locations to generate a plurality of labeled images based upon the second plurality of images. In this manner, a large collection of labeled images may be collected without the need for manual labeling by a human actor. This large collection of labeled images may then form the training set for training a ML system. The disclosure, however, is not limited to these exemplary embodiments and applications or to the manner in which the exemplary embodiments and applications operate or are described herein.

Unless otherwise defined, scientific and technical terms used in connection with the present teachings described herein shall have the meanings that are commonly understood by those of ordinary skill in the art. Further, unless otherwise required by context, singular terms shall include pluralities and plural terms shall include the singular.

It should be understood that while ML may be discussed in conjunction with various embodiments herein, the various embodiments herein are not limited to being associated only with ML tools. As such, deep learning (DL) and/or artificial intelligence (AI) tools generally may be applicable as well. Moreover, the terms ML, DL, and AI may even be used interchangeably in generally describing the various embodiments of systems, software, and methods herein.

Machine Learning

As used herein, the terms "machine learning (ML)," "ML procedure," "ML process," "ML operation," and "ML algorithm" generally refer to any system or analytical and/or statistical procedure that may progressively improve computer performance of a task. Examples of ML processes include supervised learning, reinforcement learning, unsupervised learning, and/or the like.

For example, an ML process may comprise a trained algorithm that is trained through supervised learning (e.g., various parameters are determined as weights or scaling factors after statistical determination of the weights or scaling factors using a training set comprising labeled examples). The ML process may comprise one or more of regression analysis, regularization, classification, dimensionality reduction, ensemble learning, meta learning, association rule learning, cluster analysis, anomaly detection, DL, or ultra-DL. The ML process may comprise, but is not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principle component regression, least absolute shrinkage and selection operation, least angle regression, canonical correlation analysis, factor analysis, independent component analysis, linear discriminant analysis, multidimensional scaling, non-negative matrix factorization, principal components analysis, principal coordinates analysis, projection pursuit, Sammon mapping, t-distributed stochastic neighbor embedding, AdaBoosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, or generative adversarial networks.

Neural Networks

Image classification/recognition generally requires accepting an input image and outputting a class or a probability of classes that best describes the image. This can be done using a computer system equipped with a processing engine, which utilizes algorithms, to process the input image and outputting a result. Image detection can also utilize a similar processing engine, whereby the system accepts an input image and identifies objects of interest within that image with a high level of accuracy using the algorithms pre-programmed into the processing engine.

Regarding the input image, the system will generally orient the input image as an array of pixel values. These pixel values, depending on the image resolution and size, will be an array of numbers corresponding to (length)×(width)×(# of channels). The number of channels can also be referred to as the depth. For example, the array could be L×W×Red Green Blue color model (RBG values). The RGB would be considered three channels, each channel representing one of the three colors in the RGB color model. For example, the system can generally characterize a 20×20 image with a representative array of 20×20×3 (for RGB), with each point in the array assigned a value (e.g., 0 to 255) representing pixel intensity. Given this array of values, the processing engine can process these values, using its algorithms, to output numbers that describe the probability of the image being a certain class (e.g., 0.80 for cell, 0.15 for cell wall, and 0.05 for no cell).

A deep neural network (DNN) generally, such as a convolutional neural network (CNN), generally accomplishes an advanced form of image processing and classification/detection by first looking for low level features such as, for example, edges and curves, and then advancing to more abstract (e.g., unique to the type of images being classified) concepts through a series of convolutional layers. A DNN/CNN can do this by passing an image through a series of convolutional, nonlinear, pooling (or downsampling, as will be discussed in more detail below), and fully connected layers, and get an output. Again, the output can be a single class or a probability of classes that best describes the image or detects objects on the image.

Regarding layers in a CNN, for example, the first layer is generally a convolutional layer (Conv). This first layer will process the image's representative array using a series of parameters. Rather than processing the image as a whole, a CNN will analyze a collection of image sub-sets using a filter (or neuron or kernel). The sub-sets will include a focal point in the array as well surrounding points. For example, a filter can examine a series of 5×5 areas (or regions) in a 32×32 image. These regions can be referred to as receptive fields. Since the filter must possess the same depth of the input, an image with dimensions of 32×32×3 would have a filter of the same depth (e.g., 5×5×3). The actual step of convolving, using the exemplary dimensions above, would involve sliding the filter along the input image, multiplying filter values with the original pixel values of the image to compute element wise multiplications, and summing these values to arrive at a single number for that examined portion of the image.

After completion of this convolving step, using a 5×5×3 filter, an activation map (or filter map) having dimensions of 28×28×1 will result. For each additional layer used, spatial dimensions are better preserved such that using two filters will result in an activation map of 28×28×2. Each filter will generally have a unique feature it represents (e.g., colors, edges, curves, etc.) that, together, represent the feature identifiers required for the final image output. These filters, when used in combination, allow the CNN to process an image input to detect those features present at each pixel. Therefore, if a filter serves as a curve detector, the convolving of the filter along the image input will produce an array of numbers in the activation map that correspond to high likelihood of a curve (high summed element wise multiplications), low likelihood of a curve (low summed element wise multiplications) or a zero value where the input volume at certain points provided nothing that would activate the curve detector filter. As such, the greater number of filters (also referred to as channels) in the Conv, the more depth (or data) that is provided on the activation map, and therefore more information about the input that will lead to a more accurate output.

Balanced with accuracy of the CNN is the processing time and power needed to produce a result. In other words, the more filters (or channels) used, the more time and processing power needed to execute the Conv. Therefore, the choice and number of filters (or channels) to meet the needs of the CNN method are specifically chosen to produce as accurate an output as possible while considering the time and power available.

To enable further a CNN to detect more complex features, additional Conv layers can be added to analyze what outputs from the previous Conv layer (i.e., activation maps). For example, if a first Conv layers looks for a basic feature such as a curve or an edge, a second Conv layer can look for a more complex feature such as shapes, which can be a combination of individual features detected in an earlier Conv layer. By providing a series of Conv layers, the CNN can detect increasingly higher-level features to arrive eventually at the specific desired object detection. Moreover, as the Conv layers stack on top of each other, analyzing the previous activation map output, each Conv layer in the stack is naturally going to analyze a larger and larger receptive field by virtue of the scaling down that occurs at each Conv level, thereby allowing the CNN to respond to a growing region of pixel space in detecting the object of interest.

A CNN architecture generally consists of a group of processing blocks, including at least one processing block for convoluting an input volume (image) and at least one for deconvolution block (or transpose convolution). Additionally, the processing blocks can include at least one pooling block and unpooling block. Pooling blocks can be used to scale down an image in resolution to produce an output available for Conv. This can provide computational efficiency (efficient time and power), which can in turn improve actual performance of the CNN. Those these pooling, or subsampling, blocks keep filters small and computational requirements reasonable, these blocks coarsen the output (can result in lost spatial information within a receptive field), reducing it from the size of the input by a factor equal to the pixel stride of the receptive fields of the output units.

Unpooling blocks can be used to reconstruct these coarse outputs to produce an output volume with the same dimensions as the input volume. An unpooling block can be considered a reverse operation of a convoluting block to return an activation output to the original input volume dimension.

However, the unpooling process generally just simply enlarges the coarse outputs into a sparse activation map. To avoid this result, the deconvolution block densifies this sparse activation map to produce both and enlarged and dense activation map that eventually, after any further necessary processing, a final output volume with size and density much closer to the input volume. As a reverse operation of the convolution block, rather than reducing multiple array points in the receptive field to a single number, the deconvolution block associates a single activation output point with multiple outputs to enlarge and densify the resulting activation output.

It should be noted that while pooling blocks can be used to scale down an image and unpooling blocks can be used to enlarge these scaled down activation maps, convolution and deconvolution blocks can be structured to both convolve/deconvolve and scale down/enlarge without the need for separate pooling and unpooling blocks.

The pooling and unpooling process can be limited depending on the objects of interest being detected in an image input. Since pooling generally scales down an image by looking at sub-image windows without overlap of windows, there is a clear loss in spatial info as the scaling down occurs.

A processing block can include other layers that are packaged with a convolutional or deconvolutional layer. These can include, for example, a rectified linear unit layer (ReLU) or exponential linear unit layer (ELU), which are activation functions that examine the output from a Conv layer in its processing block. The ReLU or ELU layer acts as a gating function to advance only those values corresponding to positive detection of the feature of interest unique to the Conv layer its processing block.

Given a basic architecture, the CNN is then prepared for a training process to hone its accuracy in image classification/detection (of objects of interest). Using training data sets, or sample images used to train the CNN so that it updates its parameters in reaching an optimal, or threshold, accuracy, a process called backpropagation (backprop) occurs. Backpropagation involves a series of repeated steps (training iterations) that, depending on the parameters of the backprop, either will slowly or quickly train the CNN. Backprop steps generally include forward pass, loss function, backward pass, and parameter (weight) update according to a given learning rate. The forward pass involves passing a training image through the CNN. The loss function is a measure of error in the output. The backward pass determines the contributing factors to the loss function. The weight update involves updating the parameters of the filters to move the CNN towards optimal. The learning rate determines the extent of weight update per iteration to arrive at optimal. If the learning rate is too low, the training may take too long and involve too much processing capacity. If the learning rate is too fast, each weight update may be too large to allow for precise achievement of a given optimum or threshold.

The backprop process can cause complications in training, thus leading to the need for lower learning rates and more specific and carefully determined initial parameters upon start of training. One such complication is that, as weight updates occur at the conclusion of each iteration, the changes to the parameters of the Conv layers amplify the deeper the network goes. For example, if a CNN has a plurality of Conv layers that, as discussed above, allows for higher-level feature analysis, the parameter update to the first Conv layer is multiplied at each subsequent Conv layer. The net effect is that the smallest changes to parameters have large impact depending on the depth of a given CNN. This phenomenon is referred to as internal covariate shift.

It should be noted that even though CNNs are spoken about in detail above, the various embodiments discussed herein could utilize any neural network type or architecture.

Computer Implemented System

In various embodiments, the systems and methods for generating training datasets for machine learning applications can be implemented via computer software or hardware.

FIG. 1 is a block diagram illustrating a computer system 100 upon which embodiments of the present teachings (such as any steps of method 200 described herein) may be implemented. In various embodiments of the present teachings, computer system 100 can include a bus 102 or other communication mechanism for communicating information and a processor 104 coupled with bus 102 for processing information. In various embodiments, computer system 100 can also include a memory, which can be a random-access memory (RAM) 106 or other dynamic storage device, coupled to bus 102 for determining instructions to be executed by processor 104. Memory can also be used for storing temporary variables or other intermediate information during execution of instructions to be executed by processor 104. In various embodiments, computer system 100 can further include a read only memory (ROM) 108 or other static storage device coupled to bus 102 for storing static information and instructions for processor 104. A storage device 110, such as a magnetic disk or optical disk, can be provided and coupled to bus 102 for storing information and instructions.

In various embodiments, computer system 100 can be coupled via bus 102 to a display 112, such as a cathode ray tube (CRT) or liquid crystal display (LCD), for displaying information to a computer user. An input device 114, including alphanumeric and other keys, can be coupled to bus 102 for communication of information and command selections to processor 104. Another type of user input device is a cursor control, such as a mouse, a trackball or cursor direction keys for communicating direction information and command selections to processor 104 and for controlling cursor movement on display 112. This input device 114 typically has two degrees of freedom in two axes, a first axis (i.e., x) and a second axis (i.e., y), that allows the device to specify positions in a plane. However, it should be understood that input devices 114 allowing for 3-dimensional (x, y and z) cursor movement are also contemplated herein.

Consistent with certain implementations of the present teachings, results can be provided by computer system 100 in response to processor 104 executing one or more sequences of one or more instructions contained in memory 106. Such instructions can be read into memory 106 from another computer-readable medium or computer-readable storage medium, such as storage device 110. Execution of the sequences of instructions contained in memory 106 can cause processor 104 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 104 for execution. Such a medium can take many forms, including but not limited to, non-volatile media, volatile media, and transmission media. Examples of non-volatile media can include, but are not limited to, dynamic memory, such as memory 106. Examples of transmission media can include, but are not limited to, coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, another memory chip or cartridge, or any other tangible medium from which a computer can read.

In addition to computer-readable medium, instructions or data can be provided as signals on transmission media included in a communications apparatus or system to provide sequences of one or more instructions to processor 104 of computer system 100 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

It should be appreciated that the methodologies described herein, flow charts, diagrams and accompanying disclosure can be implemented using computer system 100 as a stand-alone device or on a distributed network or shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 100, whereby processor 104 would execute the analyses and determinations provided by these engines, subject to instructions provided by any one of, or a combination of, memory components 106/108/110 and user input provided via input device 114.

Figure 2:
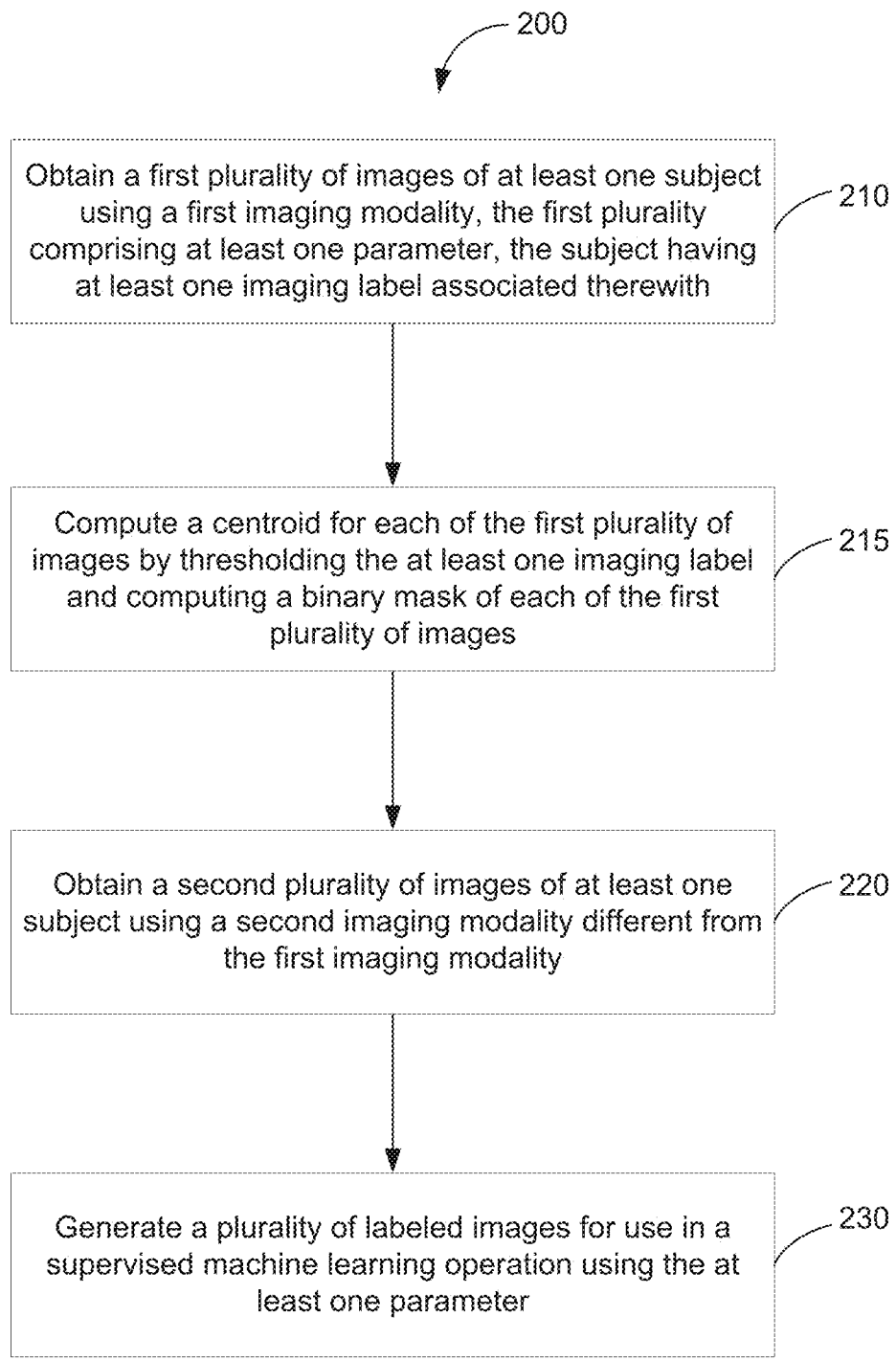
FIG. 2 is a simplified diagram of a method for generating training datasets for ML applications, in accordance with various embodiments.

FIG. 2 is a simplified diagram of an example method 200. The method can be used for generating training datasets for ML applications. In accordance with various embodiments, the method 200 may comprise a step 210 of obtaining a first plurality of images of at least one subject using a first imaging modality. The subject may have an imaging label associated therewith. One or more images of the first plurality of images (such as all images of the first plurality or any subset of images of the first plurality) may comprise at least one parameter. For instance, one or more images of the first plurality may comprise a region of interest (ROI) that may be identified by the presence of the imaging label.

In accordance with various embodiments, the at least one subject may comprise at least one animal. For instance, the at least one subject may comprise at least one vertebrate, mammal, rodent, mouse, rat, guinea pig, hamster, rabbit, pig, sheep, dog, cat, non-human primate, monkey, chimpanzee, bird, fish, amphibian, frog, human, or any other animal. The method 200 may comprise associating the imaging label with the at least one subject. For instance, the method 200 may comprise affixing or attaching the imaging label to the at least one subject. The imaging label may be affixed or attached to any part or portion of the at least one subject, such as at least one arm, leg, hand, foot, paw, toe, finger, digit, head, nose, mouth, ear, neck, throat, shoulder, back, chest, belly, tail, or any other part or portion of the at least one subject. The at least one subject may comprise at least one object in an environment. For instance, the least one subject may comprise at least one vehicle, household object, article of furniture, article of decor, consumer product, industrial component, or agricultural product.

In accordance with various embodiments, the at least one imaging label may comprise at least one fluorescent imaging label. For instance, the at least one imaging label may comprise at least one fluorescent protein, green fluorescent protein (GFP), enhanced GFP (EGFP), yellow fluorescent protein (YFP), enhanced YFP (EYFP), red fluorescent protein (RFD), blue fluorescent protein (BFP), enhanced BFP (EBFP), EBFP2, cerulean, cyan fluorescent protein (CFP), enhanced CFP (ECFP), mCFP, mTurqoise2, CyPet, mKeima-Red, AmCyan1, Midoriishi cyan, TurboGFP, TagGFP, Emerald, Azami Green, ZsGree1, TagYFP, mCitrine, YPet, TurboYFP, ZsYellow1, Kusabira orange, mOrange, TurboRFP, TagRFP, DsRed, DsRed2, mStrawberry, TurboFP602, AsRed2, mRFP1, J-Red, R-phycoerythrin, B-phycoerythrin, mCherry, HcRedl, Katusha, peridinin chlorophyll, mKate, TurboFP635, mPlum, mRaspberry, xanthene or a xanthene derivative, fluorescein, rhodamine, x-rhodamine, lissamine rhodamine B, Oregon green, eosin, Texas red, cyanine or a cyanine derivative, indocarbocyanine, oxacarbocyanine, thiacarbocyanine, merocyanine, allophycocyanin, squaraine or a squaraine derivative, squaraine rotaxane, naphthalene or a naphthalene derivative, dansyl, prodan, coumarin or a coumarin derivative, hydroxycoumarin, aminocoumarin, methoxycoumarin, oxadiazole or an oxadiazole derivative, pyridyloxazole, nitrobenzoxadiazole, benzoxadiazole, anthracene or an anthracene derivative, anthraquinone, DRAQ5, DRAQ7, CyTRAK Orange, acridine or an acridine derivative, proflavine, acridine orange, acridine yellow, arylmethine or an arylmethine derivative, auramine, crystal violet, malachite green, tetrapyrrole or a tetrapyrrole derivative, porphin, phthalocyanine, bilirubin, dipyrromethene or a dipyrromethene derivative, Cascade Blue, Pacific Blue, Pacific Orange, Lucifer yellow, Red 613, TruRed, FluorX, G-Dye100, G-Dye200, G-Dye300, G-Dye400, Cy2, Cy3, Cy3B, Cy3.5, Cy5, Cy5.5, Cy7, TRITC, Hoechst 33342, Hoechst 33258, DAPI, SYTOX Blue, chromomycin A3, mithramycin, YOYO-1, ethidium bromide, SYTOX green, SYTOX orange, TOTO-1, TO-PRO-1, TOTO-3, TO-PRO-3, propidium iodide, LDS 751, BODIPY, BODIPY-FL, aza-BODIPY, CF dye, EverFluor, Alexa Fluor, Bella Fluor, DyLight Fluor, FluoProbe, HyLite Fluor, Seta, SeTau, SureLight, or any other fluorescent imaging label. The at least one imaging label may comprise any functionalized derivative of any of the preceding fluorescent imaging labels, such as any amino-, carboxylate-, isothiocyanate-, hydrazine-, carboxyl-, carbodiimide-, thiol-, maleimide-, acetyl bromide-, azide-, or glutaraldehyde-functionalized derivative of any of the preceding fluorescent imaging labels.

In various embodiments, the at least one imaging label comprises a plurality of imaging labels. The plurality of imaging labels may comprise at least 2, 3, 4, 5, 6, 7, 8, 9, 10, 20, 30, 40, 50, 60, 70, 80, 90, 100, or more imaging labels. The plurality of imaging labels may comprise at most 100, 90, 80, 70, 60, 50, 40, 30, 20, 10, 9, 8, 7, 6, 5, 4, 3, or 2 imaging labels. The plurality of imaging labels may comprise a number of imaging labels that is within a range defined by any two of the preceding values. The plurality of imaging labels may be associated with a plurality of physiological locations on the subject. For example, the plurality of imaging labels may be associated with a head, face, nose, mouth, ear, neck, shoulder, chest, arm, elbow, hand, paw, finger, hip, leg, knee, foot, or toe of the subject, or any portion thereof. Each imaging label of the plurality may be associated with a particular physiological location on the subject. Each imaging label of the plurality may be associated with a different physiological location on the subject. In this manner, multiple landmarks on the subject may be labeled for simultaneous tracking. The plurality of imaging labels may be generated using the parallel labeling approach described herein.

In accordance with various embodiments, the first imaging modality may comprise a fluorescence imaging modality and the first plurality of images may be obtained using a fluorescence imaging technique. For instance, the first plurality of images may be obtained using a fluorescence imaging camera or a fluorescence microscope.

In accordance with various embodiments, the method 200 may comprise a step 220 of obtaining a second plurality of images of the at least one subject using a second imaging modality different from the first imaging modality. The second imaging modality may comprise a visible light imaging modality. For instance, the second plurality of images may be obtained using a visible light camera or a visible light microscope. The second imaging modality may comprise a brightfield imaging modality.

In accordance with various embodiments, the first plurality of images and the second plurality of images may be obtained in an interlaced manner. That is, the first imaging modality may obtain a first image of the subject. The second imaging modality may then obtain a second image of the subject. The first imaging modality may then obtain a third image of the subject, and so forth. In this manner, the first image of the first plurality of images and the first image of the second plurality of images may be obtained closely in time, when the subject is unlikely to have moved substantially. The second image of the first plurality and the second image of the second plurality may be obtained closely in time, and so forth. Thus, the first plurality of images and the second plurality of images may each comprise a time series of images corresponding to nearly the same points in time, which may allow confidence that inferences gleaned from the first plurality of images are very likely to hold true for the second plurality of images. Alternatively or in combination, the first plurality of images and the second plurality of images may be obtained substantially simultaneously.

In accordance with various embodiments, the method 200 may comprise a step 230 of generating a plurality of labeled images using the at least one parameter. The plurality of labeled images may be generated for use in a supervised ML operation. For instance, the at least one parameter may comprise a region of interest (ROI) within the images of the first plurality of images that may be identified by the presence of the imaging label. The location of the ROI within the images may be identified by, for instance, calculating a centroid of a fluorescence signal within the one or more images. The use of an imaging label may provide a strong signal at the ROI with a relatively low background signal, allowing easy identification of the centroid within the images of the first plurality with little or no need for manual human intervention. The centroid may be calculated by thresholding the fluorescence signal and computing a binary mask of the thresholded image (step 215). The location of the centroid may then be mapped onto the images of the second plurality of images to form the plurality of labeled images. When the first plurality of images and the second plurality of images each comprise a time series of images corresponding to nearly the same points in time, the location of the centroid may serve as a close approximation to the location of the ROI within the images of the second plurality of images. As such, the method may generate very large quantities of labeled images with little or no need for manual human intervention.

The method 200 may have the advantage that fluorescent dye that is transparent in the optical range can effectively be switched between visible and invisible states by switching the wavelength of illumination between UV and optical. This phenomenon may be leveraged to capture pairs of nearly identical images with and without a visible marker. In one image of the pair, the UV source is switched on and a fluorescent dye pattern is visible, while in the other, the UV source is switched off and the dye pattern is invisible. The dye pattern may then be used to compute landmark positions, and those positions may be used as labels for the natural-looking, pattern-free image. In this way, natural images without a visible dye pattern receive labels. Because the process does not require manual human labeling, it may be iterated at video frame rates, yielding large numbers of labeled images without significantly human input.

Slight mismatches between images of the first plurality of images and images of the second plurality of images may be compensated using a generative adversarial network (GAN) operation, such as a cycleGAN procedure (for instance, as described in J.-Y. Zhu et al., "Unpaired Image-to-Image Translation using Cycle-Consistent Adversarial Networks," arXiv:1703.10593, located at https://arxiv.org/abs/1703.10593, which is entirely herein incorporated by reference for all purposes).

In accordance with various embodiments, the imaging label may comprise a visual barcode. For instance, the visual barcode may comprise a random or pseudo-random pattern associated with a ROI, such as a random or pseudo-random pattern of fluorophores. The visual barcode may comprise a pattern having a relatively high spatial frequency. The barcode may allow matching of images in the first plurality of images with images in the second plurality of images using, for instance, computer vision feature-matching procedures, such as scale-invariant feature transformation (SIFT). In this manner, slight mismatches between pairs of images may be reduced, increasing the reliability of the training set.

In accordance with various embodiments, the plurality of labeled images may be generated at a rate exceeding the capability of manual human labeling. For instance, the plurality of labeled images may be generated at a rate of at least about 1 image per second (img/s), 2 img/s, 3 img/s, 4 img/s, 5 img/s, 6 img/s, 7 img/s, 8 img/s, 9 img/s, 10 img/s, 20 img/s, 30 img/s, 40 img/s, 50 img/s, 60 img/s, 70 img/s, 80 img/s, 90 img/s, 100 img/s, 200 img/s, 300 img/s, 400 img/s, 500 img/s, 600 img/s, 700 img/s, 800 img/s, 900 img/s, 1,000 img/s, or more. The plurality of labeled images may be generated at a rate of at most about 1,000 img/s, 900 img/s, 800 img/s, 700 img/s, 600 img/s, 500 img/s, 400 img/s, 300 img/s, 200 img/s, 100 img/s, 90 img/s, 80 img/s, 70 img/s, 60 img/s, 50 img/s, 40 img/s, 30 img/s, 20 img/s, 10 img/s, 9 img/s, 8 img/s, 7 img/s, 6 img/s, 5 img/s, 4 img/s, 3 img/s, 2 img/s, 1 img/s, or less. The plurality of labeled images may be generated at a rate that is within a range defined by any two of the preceding values. For instance, the plurality of labeled images may be generated at a rate of about 1 img/s to about 100 img/s.

In accordance with various embodiments, the size of the plurality of labeled images may be increased by performing one or more data augmentation operations on the plurality of labeled images. That is, one or more images from the plurality of labeled images may be duplicated one or more times and one or more data augmentation operations may be performed on the one or more duplicates. The one or more data augmentation operations may be selected from the group consisting of: blurring, Gaussian blurring, contrast scaling, random contrast scaling, additive noise addition, Gaussian additive noise addition, channel scaling, random channel scaling, cropping, random cropping, affine warping, random affine warping, grayscale conversion, and probabilistic grayscale conversion. By augmenting the plurality of labeled images with such additional augmented images, an ML operation may be trained using a much large training set that includes non-idealities such as noise and other distortions. Such non-idealities may help to train the ML operation to be more robust to non-ideal conditions when applied to real-world images.

In accordance with various embodiments, the method 200 may further comprise training the supervised ML operation using the plurality of labeled images and any augmented duplicate images. The supervised ML operation may comprise a neural network (NN), such as any NN described herein. The supervised ML operation may comprise a sliding window classifier. The method 200 may further comprise applying the supervised ML operation to a third plurality of images. ROIs within the third plurality of images may be inferred using the ML operation. In some cases, inferences from the supervised ML operation may be displayed to a user in real time. For instance, the supervised ML operation may be applied to a live video stream and individual frames of the video may be analyzed shortly after they are captured. An inferred location of the ROI within the frames may be displayed to a user. If the inferred location of the ROI is displayed within an expected region of the frames, the user may take this as an indication that the supervised ML operation is functioning properly. If, on the other hand, the inferred location of the ROI does not match the user's expectation, the user may adjust their imaging setup (such as camera or lighting location or orientation) in an attempt to improve the correspondence between the inference and their expectations. In this manner, a user may quickly improve or optimize their imaging setup to achieve more accurate inferences. Alternatively or in combination, an indication of how well the inference may be working may be provided to the user. The indication may comprise one or more metrics associated with the performance of the ML operation at a point in time, such as a confidence score or a smoothness of a trajectory. The user may utilize such indications as feedback to improve or optimize their imaging setup.

Although described herein as utilizing fluorescence imaging as the first imaging modality and visible light imaging as the second imaging modality, the method 200 may be implemented using other imaging modalities. For instance, both the first and the second imaging modalities may use visible light imaging modalities. For example, the method 200 may utilize one or more beamsplitters to split light of different wavelengths or set of wavelengths and to direct the light to different detectors. In this manner, the first imaging modality may detect light of a first wavelength or set of wavelengths, which may correspond to a wavelength emitted by the at least one imaging label. The second imaging modality may detect light of a first wavelength or set of wavelengths that is different from the first wavelength or set of wavelengths. Alternatively or in combination, the method 200 may utilize one or more spectral filters to sensitize the first and second imaging modalities to different wavelengths or sets of wavelengths.

It should also be appreciated that any operation, sub-operation, step, sub-step, process, or sub-process of method 200 may be performed in an order or arrangement different from the embodiments illustrated by FIG. 2. For example, in other embodiments, one or more operations may be omitted, combined, separated, or added.

Figure 3:
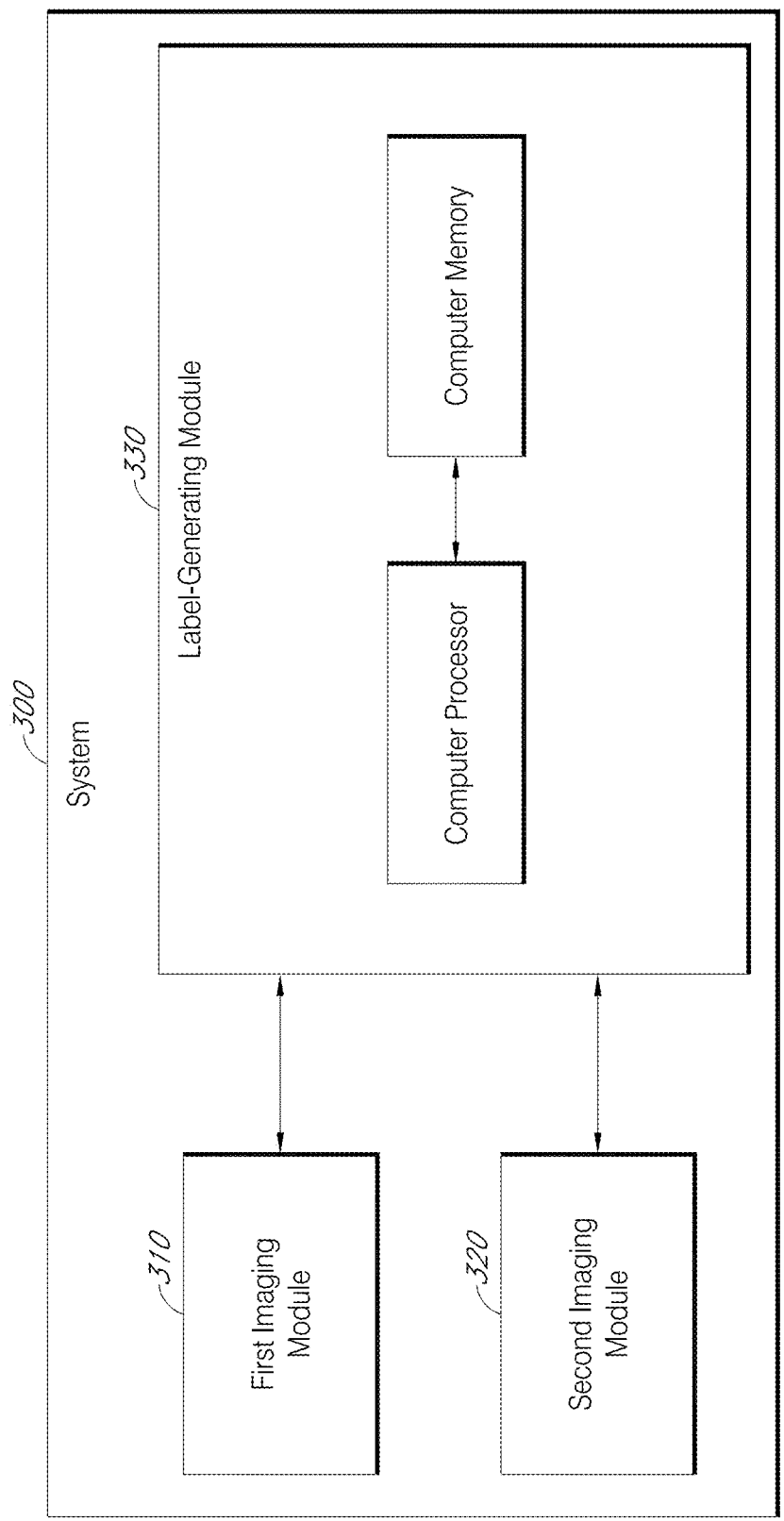
FIG. 3 is a simplified diagram of a system for generating training datasets for ML applications, in accordance with various embodiments.

FIG. 3 is a simplified diagram of an example system 300 for generating training datasets for ML applications. In accordance with various embodiments, the system 300 may comprise a first imaging module 310 configured to obtain a first plurality of images of at least one subject using a first imaging modality. One or more images of the first plurality of images (such as all images of the first plurality or any subset of images of the first plurality) may comprise at least one parameter. The first plurality of images, the first imaging modality, the at least one subject, and/or the at least one parameter may be similar to the first plurality of images, the first imaging modality, the at least one subject, and/or the at least one parameter, respectively, described herein (for instance, with respect to method 200). The first imaging module may comprise a first image detector, such as a camera or microscope. The first imaging module may comprise a first lighting source, such as a laser or light-emitting diode (LED).

In accordance with various embodiments, the system 300 may comprise a second imaging module 320 configured to obtain a second plurality of images of the at least one subject using a second imaging modality. The second plurality of images, the second imaging modality, and the at least one subject may be similar to the second plurality of images, the second imaging modality, and the at least one subject, respectively, described herein (for instance, with respect to method 200). The second imaging module may comprise a second image detector, such as a camera or microscope. The second imaging module may comprise a second lighting source, such as a laser or LED.

In accordance with various embodiments, the system 300 may comprise a label-generating module 330 configured to generate a plurality of labeled images using the at least one parameter. The plurality of labeled images may be generated for use in a supervised ML operation. The label-generating module may comprise one or more processors and a memory coupled to the one or more processors. The one or more processors may be configured to generate the plurality of labeled images for use in the supervised ML operation. The memory may be configured to provide the one or more processors with instructions that, when executed, cause the one or more processors to generate the plurality of labeled images for use in the supervised ML operation.

EXAMPLES

Example 1

Capture of Rodent Poses

Landmarks on mouse limbs were marked with an ultraviolet (UV) fluorescent dye. High-frequency UV and visible strobe lights were then applied to collect pairs of marked UV images and unmarked visible images. By alternately strobing UV and visible illumination sources at high speed, pairs of images were generated: one with the dye visible, the other with the dye invisible. These images corresponded to nearly the same point in time. Thus, information about the location of the marker in the UV images could be used to label the region of interest in the visible images. The centroid of the dye region was then extracted from the UV image using image processing operations, yielding an (x, y) label that could be paired with the corresponding visible image and used to train a neural network. Using this approach, a single camera capturing frames at 200 Hertz (Hz) yielded 100 paired images per second. A single researcher could therefore generate over 20,000 labeled images in an hour-long session, compared to fewer than 500 when labeling images manually. The neural networks were then used to identify the specific region of interest on a new, unlabeled animal. Since the only marker used was a dye, the mouse was free to perform any variety of behaviors over minutes to hours, all while very large sets of training data were captured.

Example 2

Methods

Video capture was performed using eight USB3 cameras: four monochrome (Basler Ace acA1440-220 um with 16 mm Tamron lens M118FM16) and four color (Basler Ace acA1920-155uc with 8 mm Tamron lens M118FM08). The cameras were triggered by an Arduino Mega 2560 Rev3 (Arduino Store, part A000067) over GPIO. Capture was performed with a desktop computer using the Basler Pylon 5 C++ API.

UV illumination was provided by thirty LED modules (LED Supply, part A008-UV400-65), each containing three LEDs, and mounted in five hexagonal clusters of six modules each. Visible illumination was provided by a similar LED configuration: five clusters containing four white LED modules each (LED Supply, part CREEXHP35-765-3) and four clusters containing four red LED modules each (LED Supply, part CREEXPE2-RED-3). LEDs were controlled by the same Arduino Mega driving power MOSFETs, and power was supplied by a BK Precision 1672 variable power supply (Test Equipment Depot, part 817050167207).

Cameras and LEDs were mounted to a 2Vgeodesic dome. The capture system was positioned over a turntable with a transparent acrylic behavior box on it, allowing rotatopm of the behaving animal relative to the cameras to acquire a greater range of camera perspectives. The dome was constructed out of ¼-inch aluminum cylindrical struts with 3D-printed mounting attachments bonded to each end using a two-part epoxy (J-B Weld 50176 KwikWeld). Each vertex of the dome was a 3D-printed circular hub to which the struts were fastened with screws. This design allowed individual parts of the dome to be removed and re-arranged as needed by unfastening the appropriate screws. All 3D printing was performed with a FormLabs Form 2 using Form-Labs Tough Resin (part RS-F2-TOTL-05).

Figure 4A:
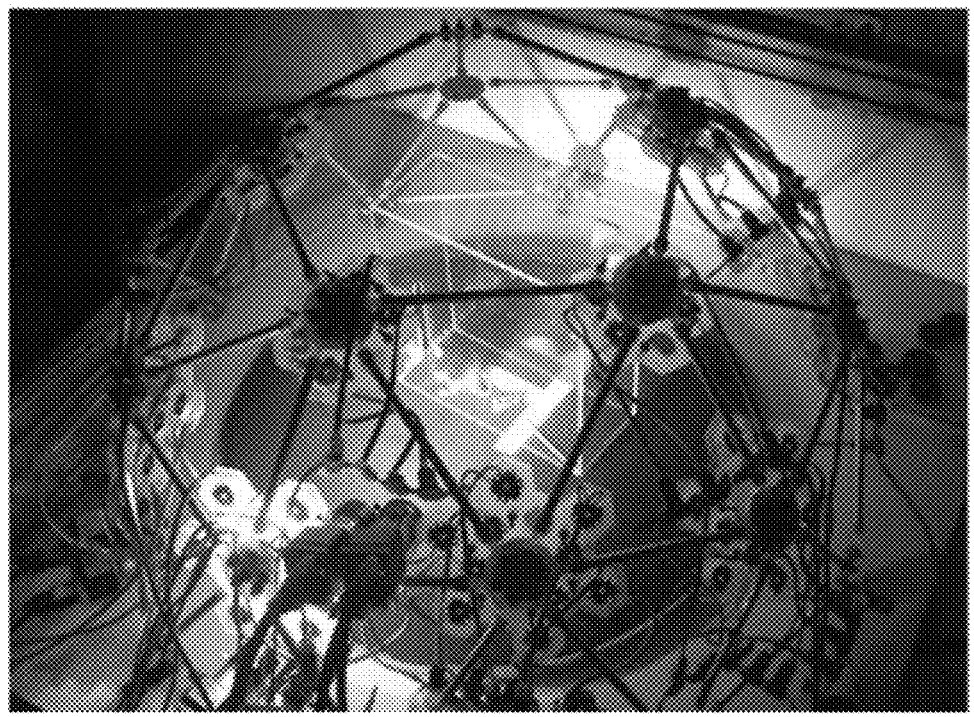
FIG. 4A shows an image of a hemispherical dome with eight cameras and nine independently controlled light sources used to track mouse movements, in accordance with various embodiments.
Figure 4B:
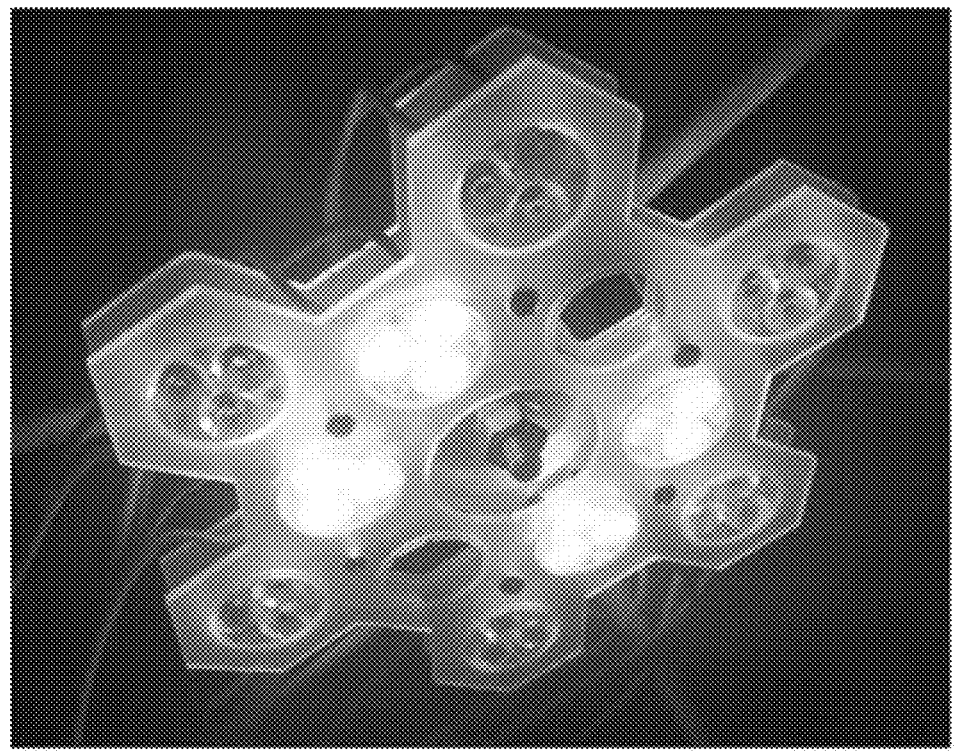
FIG. 4B shows an example of illumination and camera triggering of the hemispherical dome, in accordance with various embodiments.

Inside the dome, the animal's behavioral apparatus was placed on a rotary turntable consisting of a ½-inch acrylic disk on a circular track. The acrylic disk was covered in a ¼-inch black urethane mat lightly sanded with medium grit sandpaper to increase friction. The dome was constructed via a combination of 3D-printing and off-the-shelf parts (¼-inch aluminum rods, steel fasteners). The behavioral apparatus was placed inside the dome and on top of a rotatable circular platform to further increase the range of possible orientations relative to the lights and cameras. FIG. 4A shows an image of the hemispherical dome with eight cameras and nine independently controlled light sources used to track mouse movements. FIG. 4B shows an example of illumination and camera triggering of the hemispherical dome.

Opticz Bright Red UV Blacklight Reactive Invisible Ink (DirectGlow, part DGINK1OZR) was used as the fluorescence dye.

Prior to video capture, animals were anesthetized with 1-3% isoflurane, and a felt-tipped marker was used to apply fluorescent dye to the target region. In all experiments, the entire forepaw, both ventral and dorsal, was coated in dye up to the wrist. The dye was allowed to dry for 5 minutes prior to video recording, and the animal was visually checked for stray dye outside of the target region.

Data were obtained from adult C57BL/6 mice (~8-12 weeks old). Procedures were conducted according to US National Institutes of Health guidelines for animal research and were approved by the Institutional Animal Care and Use Committee of The Salk Institute for Biological Studies. The animals were tasked with three behaviors: reaching, rope pull, and free movement. For the reach behavior, animals were food restricted and trained to reach for a food pellet through a slot in a transparent acrylic enclosure. Briefly, the training protocol consisted of placing the mouse in a 20 cm tall×8.5 cm wide×19.5 cm long clear acrylic box with an opening in the front of the box measuring 0.9 cm wide and 9 cm tall. A 3D-printed, 1.8 cm tall pedestal designed to hold a food pellet (20 mg, 3 mm diameter; Bio-Serv) was placed 1 cm away from the front of the box opening and displaced 0.5 cm lateral to the opening and opposite the mouse's preferred reaching forelimb. Food pellets were placed on top the pedestal as the reaching target. Mice were food deprived to ~85% of their original bodyweight and trained to reach for food pellets for either 20 minutes or until 20 successful reaches (defined as pellet retrieval) were accomplished. For the rope pull behavior, animals were food deprived as described above. Ten to twenty strings were suspended above an open cage; one end of the string was placed within reach of the animal, and the other end was attached to a food reward. Through exploration, animals learned to pull the string into the cage to receive the reward. For the freely moving behavior, the animals did not receive any training or food rewards and were allowed to roam freely within the enclosure.

Figure 5A:
FIG. 5A shows an example of a mouse recorded under visible illumination, in accordance with various embodiments.
Figure 5B:
FIG. 5B shows an example of a mouse recorded under ultraviolet (UV) illumination, in accordance with various embodiments.

For all behaviors, the cameras were triggered at a frame rate of 200 Hz and a resolution of 848×848 under alternating visible and UV illumination, and temporally adjacent frames were grouped into pairs. For the freely moving behavior, to decrease data bandwidth, only 1 out of every 50 image pairs was recorded to disk (a rate of 2 pairs per second). For the reaching and rope pull behaviors, all image pairs were recorded at the full rate of 100 pairs per second, but to decrease data bandwidth, recording was only activated by the experimenter during individual reaches or rope pulling bouts respectively. To decrease the number of frames missed due to the delay between behavior onset and the experimenter starting the video recording, image pairs were continuously saved to a 100-pair buffer in memory that was written to disk upon activation of video recording. FIG. 5A shows an example of a mouse recorded under visible illumination. FIG. 5B shows an example of a mouse recorded under UV illumination.

Example 3

Serial Labeling

Fluorescent dye was used to implement two different approaches for generating labels automatically at large scale. In the first approach, a single landmark at a time was labeled with the fluorescent dye, and the entire data capture process was repeated for each landmark. This approach may be referred to as "serial labeling". In the second approach, the dye was applied in a random speckle pattern, yielding a large number of visually identifiable local regions or "visual barcodes". With computer vision techniques, visual barcodes may be used to label many landmarks in parallel. Such a method may be referred to as "parallel labeling." Parallel labeling may, in principle, be the more powerful of the two approaches, as it may allow rapid generation of labeled images at a large number of landmarks. However, serial labeling may have the advantage of being more applicable to non-smooth surfaces containing large amounts of fur or hair.

In the serial labeling approach, a felt-tipped marker was used to apply the dye to the region of interest. When data was collected over multiple sessions, the dye needed to be applied to the target region multiple times. However, for the target region (the rodent forepaw), session-to-session variability did not have a noticeable impact on label quality.

Two different schemes were utilized for temporal sequencing of image capture and illumination: biphasic and triphasic illumination. In the biphasic illumination scheme, the fluorescence images were captured at the same time that the UV source was on and was actively driving the dye. This scheme is intuitive, but because the was is flooded with UV light during image capture, light from the UV source could wash out the fluorescence signal, decreasing the signal-to-noise ratio and making the dye more difficult to localize during post-processing. To suppress background UV light, an optical low-pass filter was mounted onto each camera. Although low-pass filtering was partly effective, off-the-shelf UV LEDs emit fairly broad-spectrum light that could not be completely removed via spectral filtering. Furthermore, the natural fluorescence of objects in the scene was another major source of nuisance light.

To reduce the effects of nuisance UV light and background fluorescence, a second temporal sequencing scheme, referred to as triphasic illumination, was developed. This scheme was based on the observation that most background fluorescence from everyday objects or laboratory apparatuses had a short temporal decay constant of less than 1 microsecond. By using a dye with a longer temporal decay constant, on the order of 1 millisecond, the UV source could be extinguished just prior to image capture, allowing background fluorescence to subside while the dye continues to fluoresce. This scheme essentially eliminates background fluorescence. Furthermore, because the scene was not illuminated during capture of UV images, there was no need for the low-pass filter. The result was a cheaper and simpler optical setup. All further examples described herein were conducted with triphasic illumination.

Figure 6A:
FIG. 6A shows an example of background fluorescence associated with a biphasic illumination procedure, in accordance with various embodiments.
Figure 6B:
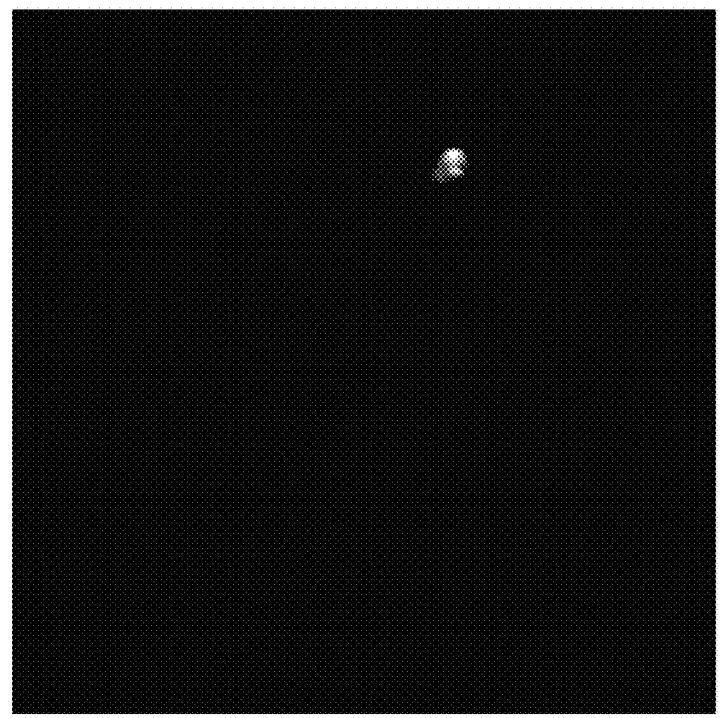
FIG. 6B shows an example of background fluorescence associated with a triphasic illumination procedure, in accordance with various embodiments.

An important constraint on any temporal sequencing scheme is that the UV and visible images should be captured close together in time. The maximum acceptable temporal spacing may depend on the speed with which the target region is moving. For imaging the rodent forepaw, a spacing of 5 ms was sufficiently small for most behaviors. For behaviors involving especially quick movements, the mismatch was further reduced by interpolating the label positions between successive UV frames in post-processing. In the case of long-duration recordings, data storage requirements can become onerous at high video framerates; therefore, short, rapid sequences of two or three images with 5 ms spacing were captured, separated by much longer delays between sequences (>500 ms). FIG. 6A shows an example of background fluorescence associated with a biphasic illumination procedure. FIG. 6B shows an example of background fluorescence associated with a triphasic illumination procedure. As shown in FIG. 6B, the background fluorescence is largely eliminated when using the triphasic illumination procedure.

The third and final component of fluorescence labeling was the post-processing stage, in which the raw UV images were processed and label positions were computed. First, the dyed target region was identified in the UV image. Because of the low background noise captured in the triphasic scheme, a simple thresholding operation was sufficient to produce an accurate binary mask indicating the presence of the dye. Second, an (x, y) position was computed from the dye mask, indicating the location of the landmark. For this step, the centroid (i.e., the center-of-mass) of the dye region was calculated. For all frames in which the dye was totally absent, the landmark position was recorded as a special token: hidden.

Figure 7B:
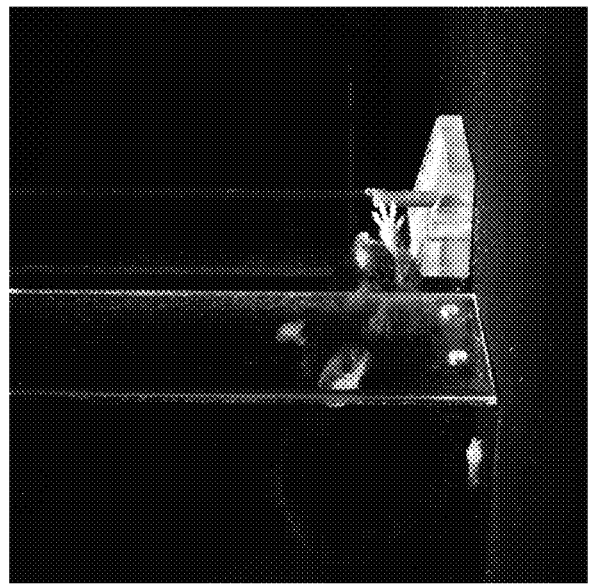
FIG. 7B shows an example of a mouse recorded under visible illumination from a second camera angle, in accordance with various embodiments.
Figure 7A:
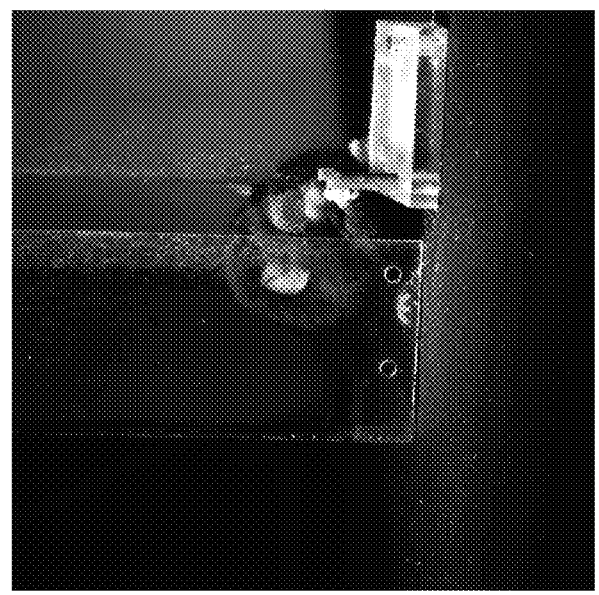
FIG. 7A shows an example of a mouse recorded under visible illumination from a first camera angle, in accordance with various embodiments.
Figure 7D:
FIG. 7D shows an example of a mouse recorded under visible illumination with a second lighting condition, in accordance with various embodiments.
Figure 7C:
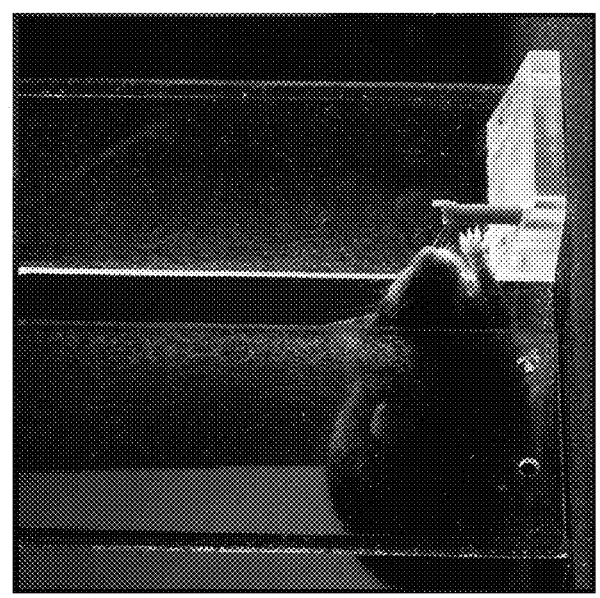
FIG. 7C shows an example of a mouse recorded under visible illumination with a first lighting condition, in accordance with various embodiments.

Fluorescence labeling can generate labeled images at video frame rates, but the images captured in this way may be highly redundant: the pose of the objects in successive frames may be nearly identical, and the camera angle and lighting conditions may not change. Because these images may not exhibit much visual diversity, neural networks trained on them may only produce accurate results in a limited range of scenarios. To address this, a video capture system (described herein with respect to Example 2) was built to generate more diverse imagery: a hemispherical dome with eight cameras and nine independently controlled light sources. By capturing the animal's behavior from multiple cameras, angular diversity was generated in parallel. By activating only one light source at a time with each successive frame, image data that also exhibited a richer variety of illumination angles was produced. FIG. 7A shows an example of a mouse recorded under visible illumination from a first camera angle. FIG. 7B shows an example of a mouse recorded under visible illumination from a second camera angle. FIG. 7C shows an example of a mouse recorded under visible illumination with a first lighting condition. FIG. 7D shows an example of a mouse recorded under visible illumination with a second lighting condition.

Figure 8B:
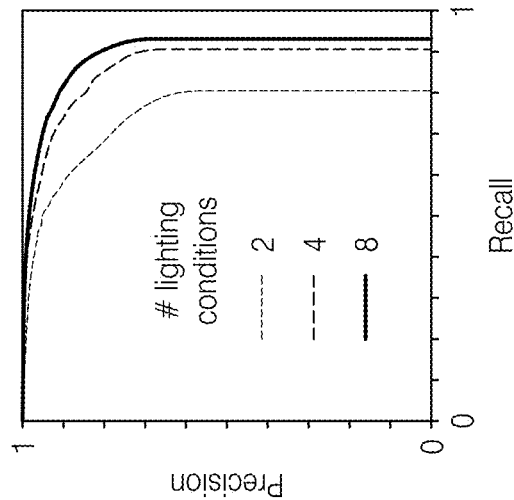
FIG. 8B shows an example of precision-recall curves for a hemispherical dome utilizing 2, 4, or 9 lighting conditions, in accordance with various embodiments.
Figure 8A:
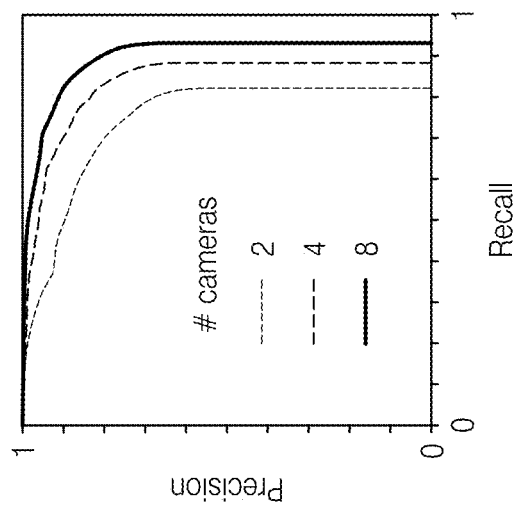
FIG. 8A shows an example of precision-recall curves for a hemispherical dome utilizing 2, 4, or 8 cameras, in accordance with various embodiments.
Figure 8C:
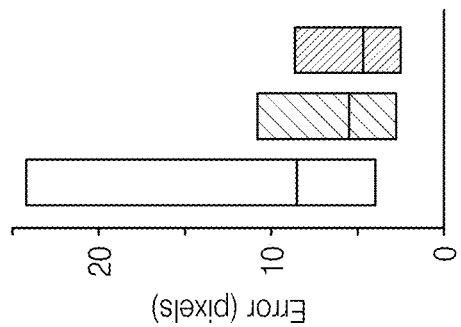
FIG. 8C shows an example of mean pixel errors for the hemispherical dome utilizing 2, 4, or 8 cameras, in accordance with various embodiments.
Figure 8D:
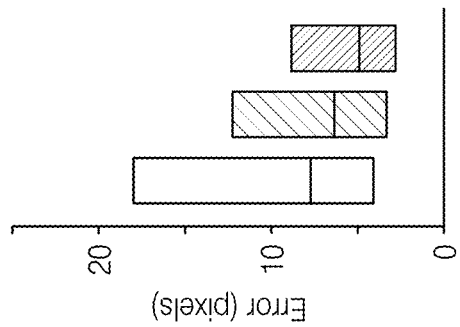
FIG. 8D shows an example of mean pixel errors for the hemispherical dome utilizing 2, 4, or 9 lighting conditions, in accordance with various embodiments.

FIG. 8A shows an example of precision-recall curves for a hemispherical dome utilizing 2, 4, or 8 cameras. FIG. 8B shows an example of precision-recall curves for a hemispherical dome utilizing 2, 4, or 9 lighting conditions. FIG. 8C shows an example of mean pixel errors for the hemispherical dome utilizing 2, 4, or 8 cameras, in accordance with various embodiments. FIG. 8D shows an example of mean pixel errors for the hemispherical dome utilizing 2, 4, or 9 lighting conditions, in accordance with various embodiments. As shown in FIGS. 8A and 8B, the use of larger numbers of cameras and lighting conditions generally improved precision and recall. As shown in FIGS. 8C and 8D, the use of larger numbers of cameras and lighting conditions generally improved mean pixel error.

Example 4

Data Collection

In order to validate the fluorescence labeling approach, two datasets were collected: the GlowTrack dataset and the Challenge dataset. The GlowTrack data set was generated using the fluorescence method to label the left forepaw of the mouse. The intention was to capture a dataset large enough to serve as a source of both training data and test data under a variety of conditions. It contained 380,000 images encompassing eight camera angles, nine lighting conditions, and three behaviors (reaching for a pellet, pulling a hanging rope, and moving freely in an enclosure). The reaching and rope-pull behaviors were captured at a framerate of 100 image pairs per second, while the freely moving behavior was captured at a rate of 2 image pairs per second.

The GlowTrack data set was divided into several hierarchically organized subsets: at the top level, a training and a test set, both referred to as Varied because they exhibited a variety of behaviors, camera angles, and lighting conditions; within each of the Varied sets, a Simple subset containing only one behavior, camera angle, and lighting condition. The distinction between Varied and Simple data sets allowed investigation of the impact of visual diversity on neural network performance.

Figure 9:
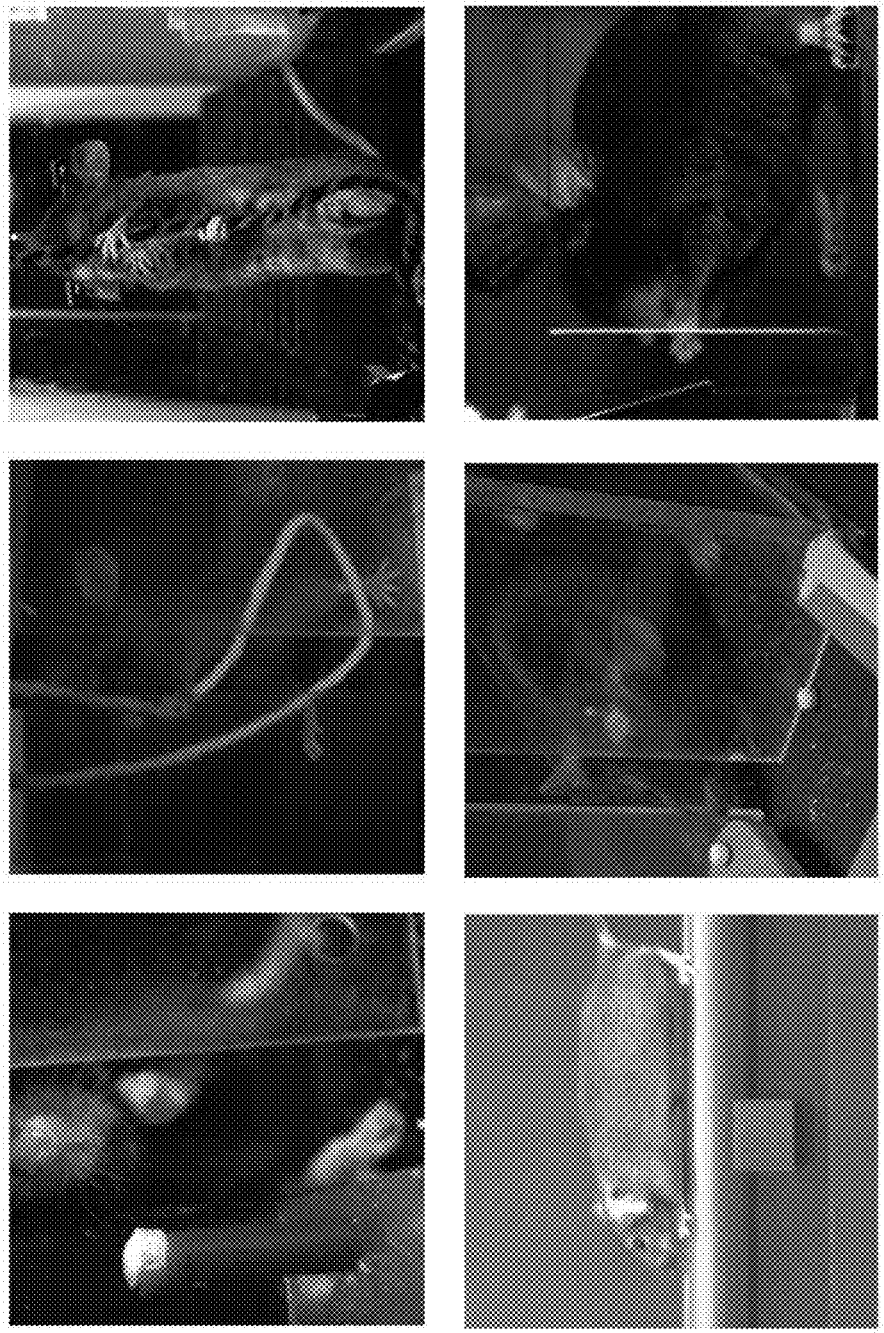
FIG. 9 shows an example of data from a Challenge data set, in accordance with various embodiments.

The Challenge data set was collected from archival video of mice behaving in different experimental setups. The intention was to acquire a robust test set that would evaluate the ability of neural networks to perform accurately on setups not seen during training. A subset of the Challenge set was manually labeled by pairs of human annotators. Each image was labeled twice, and the labels were compared to ensure consistency. FIG. 9 shows an example of data from the Challenge data set.

To create the Challenge data set, data was sampled from a variety of archival data sets. Represented in these data sets were two different labs, six different behaviors (pellet reach, water reach, treadmill, balance beam, open field, rope pull), and both color and grayscale imagery. All data had been collected under different lighting conditions and from different cameras than the GlowTrack data set. The water reach, treadmill, rope pull, and balance beam behaviors had been captured on behavioral apparatuses different from those represented in the GlowTrack data set.

In order to test the methods that were designed to process video data rather than individual frames, it was useful to sample video clips from the archival data sets, not simply individual frames. Each archival data set contained a different number of videos of vastly different lengths; simply combining all data sets would have resulted in a highly skewed number of frames per data set. Therefore, 4 to 16 clips were sampled per dataset, depending on the specific video sizes, to achieve a more balanced number of frames from each data set. From among those clips, 600 random images were sampled to receive ground-truth labels.

To produce ground-truth labels for the Challenge set, the sampled images were manually labeled using LabelStudio, an open-source web application. Each frame was labeled by two different annotators. Annotators were instructed not to guess the location of any landmark unless it was obvious: if a landmark was out of the camera's field of view or occluded such that it was impossible to know its precise location, then that landmark was labeled as hidden. Only frames for which both annotators marked the landmark as hidden or the annotators' labels were within 5 pixels of each other were retained in the final label set. The two annotator's landmark locations for each frame were averaged to produce the final location.

Example 5

Neural Network Training

The neural network used for all experiments was the DeeperCut neural network, which is based on the ResNet-101 architecture pre-trained on ImageNet and fine-tuned on the given training data set. Each network was trained for 4.12 million training iterations with an image pre-scaling factor of 0.8 except where otherwise noted. These parameter values were each selected using one-dimensional, 1-D, grid search. All other training parameters were set to their default values. During training, more extensive data augmentation was applied than was used in the original DeeperCut implementation. Each training image was randomly augmented using Gaussian blur, random contrast scaling, additive Gaussian noise, random channel scaling, random cropping, random affine warping, and conversion of color images to grayscale with a 50% probability.

Precision-recall curves were generated using the following definitions of detections, precision, and recall. A detection is a predicted landmark position for which the ground truth label is not hidden and the pixel distance from ground-truth is less than a particular threshold (5% of the image width unless otherwise noted). Precision, for a given confidence threshold, is the number detections with confidence greater than threshold divided by the total number of predictions with confidence greater than the threshold. Recall is the number of detections with confidence greater than threshold divided by the number of images where the ground truth label is not hidden.

Example 6

Limitations Due to Small Training Sets

Prior work on rodent pose tracking in the laboratory setting has focused on evaluating landmark detectors with training and testing data drawn from the same experimental setups and often from the same video clips. In these settings, systems like DeepLabCut have been shown to produce accurate results even with fewer than 1,000 labeled training examples. Less well-studied, however, is the accuracy of these types of detectors when applied to test data captured under novel camera angles, lighting conditions, or experimental setups not represented in the training data set. However, detectors trained in this way were observed to perform significantly worse when conditions changed even slightly. Thus, the robustness of detectors trained in the small dataset regime was characterized.

First, 1,000 training images were sampled from the Simple data set, representing an experimental setup under fixed conditions. In agreement with previously published results, a neural network trained and tested on this data could achieve landmark detection with high accuracy: an area under the curve (AUC) of 0.90 and a median pixel error of 5.04. To test the dependence of performance on the number of training examples, but captured from the same camera angle and lighting conditions, networks were also trained on subsets of size 500 and 250 respectively, with slightly degraded results.

To test the robustness of these networks under different visual conditions, they were tested on images drawn from the Varied data set, representing eight camera angles and nine lighting conditions. Accuracy decreased substantially: for the network trained on 1,000 images, AUC dropped from 0.90 to 0.33 and median pixel error increased from 5.04 to 145.44. These results support the notion that networks trained in the small dataset regime are relatively sensitive to imaging conditions than the training data.

A natural question is whether this sensitivity to conditions is due to the small size of the training set or to the fact that it contains only one camera angle and lighting condition.

Therefore, for comparison, a network was trained with 1,000 images drawn from the Varied test set, representing all eight camera angles and nine lighting conditions seen in the test set. While this network achieved better accuracy both in terms of AUC (0.51) and median pixel error (13.99), these results were still substantially worse than when training and testing on the Simple data set. This suggests that in order for a network to perform well under variable imaging conditions, more training data may be required.

Example 7

Enhanced Performance from Large Training Sets

To test the effect of number of training samples, a network was trained on the full Varied training set containing 300,000 images. Indeed, this network achieved a much better AUC (0.89) and median pixel error (4.69). This result indicates that training on a large-scale dataset generated using the fluorescence labeling techniques described herein can achieve robustness to variable imaging conditions not possible with manual labeling in the small dataset regime.

Figures 10A, 10B:
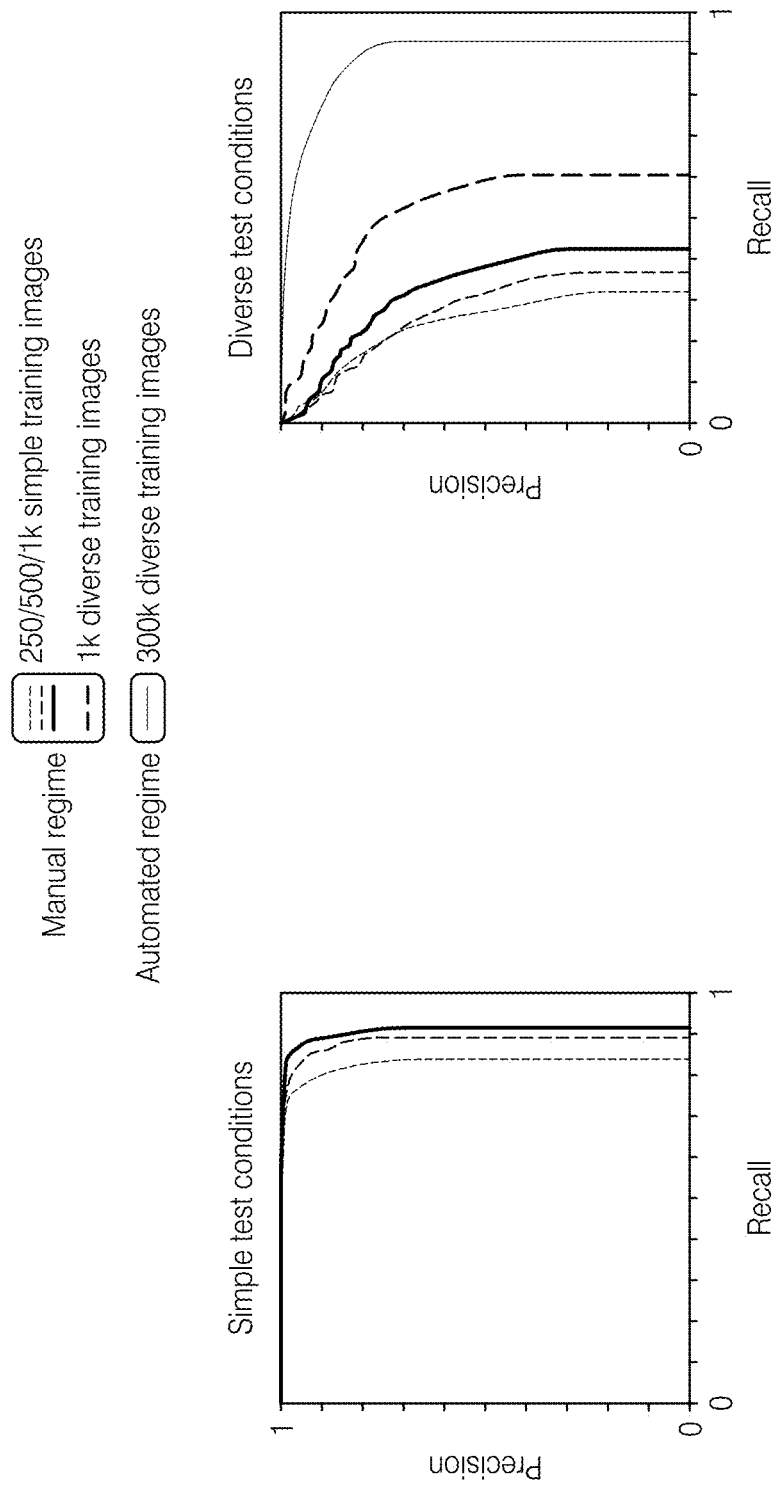
FIG. 10A shows an example of precision-recall curves for a Simple data set trained with 250, 500, or 1,000 simple training images, in accordance with various embodiments.
FIG. 10B shows an example of precision-recall curves for a Diverse data set trained with 250, 500, or 1,000 simple, and 1,000 or 300,000 diverse training images, in accordance with various embodiments.
Figure 10D:
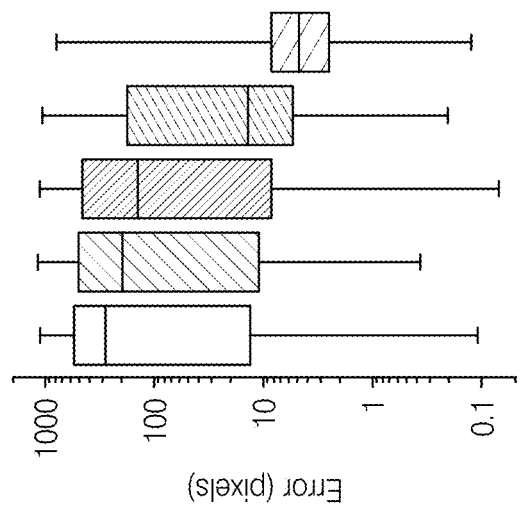
FIG. 10D shows an example of mean pixel errors for the Diverse data set trained with 250, 500, or 1,000 simple, and 1,000 or 300,000 diverse training images, in accordance with various embodiments.
Figure 10C:
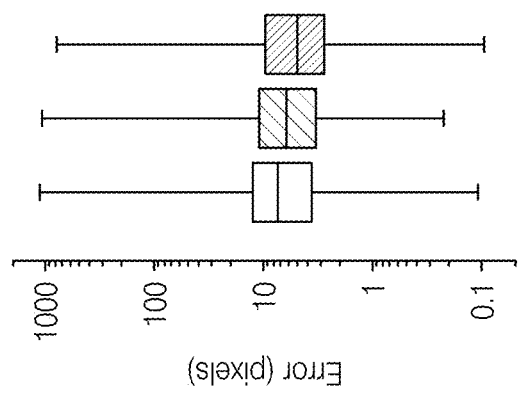
FIG. 10C shows an example of mean pixel errors for the Simple data set trained with 250, 500, or 1,000 simple training images, in accordance with various embodiments.

FIG. 10A shows precision-recall curves for the Simple data set trained with 250, 500, or 1,000 simple training images. FIG. 10B shows precision-recall curves for the Diverse data set trained with 250, 500, or 1,000 simple, and 1,000 or 300,000 diverse training images. FIG. 10C shows mean pixel errors for the Simple data set trained with 250, 500, or 1,000 simple training images. FIG. 10D shows mean pixel errors for the Diverse data set trained with 250, 500, or 1,000 simple, and 1,000 or 300,000 diverse training images. As shown in FIGS. 10A and 10B, the use of larger training sets generally improved precision and recall. As shown in FIGS. 10C and 10D, the use of larger training sets generally improved mean pixel error.

A network trained on a large-scale fluorescence data set was then analyzed on the Challenge set, representing a variety of experimental setups. The different size scales of the mouse in the different setups had a significant impact on performance, a technique was implemented for optimizing over scales at test time, as described herein with respect to Example 8. A network trained on the full GlowTrack dataset (380,000 images) and with the additional scale-optimization step achieved an AUC of 0.72 and a median pixel error of 13.55. By comparison, the network trained on 1,000 Simple images produced an AUC of 0.16 and a median pixel error of 306.92, while the network trained on 1,000 Varied images produced similar results (AUC of 0.22, median pixel error of 184.67).

Figures 11A, 11B:
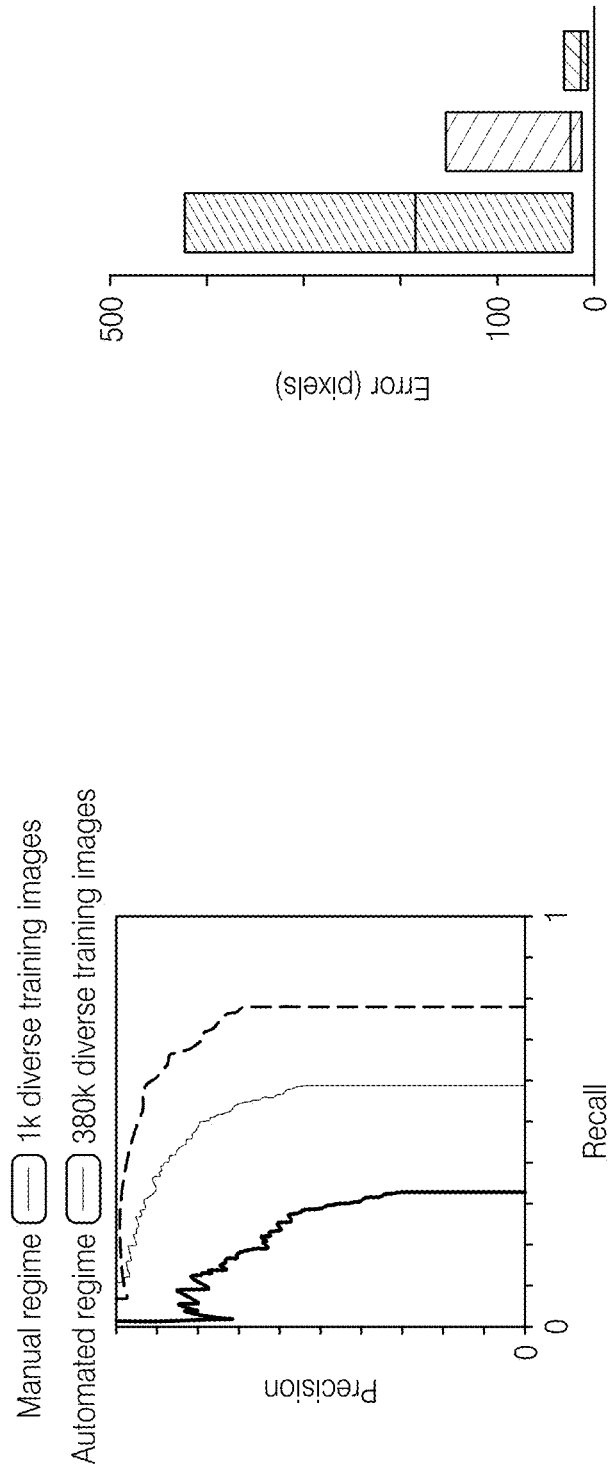
FIG. 11A shows an example of precision-recall curves for a Challenge data set trained on 1,000 diverse training images, 380,000 diverse training images, or 380,000 diverse training images with test-time scale optimization applied, in accordance with various embodiments.
FIG. 11B shows an example of mean pixel errors for the Challenge data set trained on 1,000 diverse training images, 380,000 diverse training images, or 380,000 diverse training images with test-time scale optimization applied, in accordance with various embodiments.

FIG. 11A shows precision-recall curves for the Challenge data set trained on 1,000 diverse training images, 380,000 diverse training images, or 380,000 diverse training images with test-time scale optimization applied. FIG. 11B shows mean pixel errors for the Challenge data set trained on 1,000 diverse training images, 380,000 diverse training images, or 380,000 diverse training images with test-time scale optimization applied. As shown in FIG. 11A, the use of larger training sets and test-time scale optimization generally improved precision and recall. As shown in FIG. 11B, the use of larger training sets and test-time scale optimization generally improved mean pixel error.

Example 8

Label Post-Processing

The evaluation experiments described herein with respect to Example 7 showed that neural networks trained with a diverse large-scale data set had greater accuracy than networks trained using the small-scale manual labeling workflow that is currently more typical for landmark detection in the laboratory setting. The addition of several additional pipeline stages helped to increase performance even further.

Image scale is an important factor for network accuracy. While testing the detector, it was noted that some errors could be corrected by rescaling the dimensions of the input image and thus changing the apparent size of the animal to more closely match that seen in the training data. Thus, test images were rescaled by a range of different factors and the resulting accuracies were plotted, revealing a strong peak. Even though the training procedure already included scale augmentation, the system achieved optimal accuracy for a relatively narrow range of scales.

For the first approach, the range of scaling factors applied to the training data during augmentation was simply increased.

For the second approach, a technique for automatically optimizing image scale at test time was developed, after the neural network has already been trained. The technique did not assume that ground-truth labels are available, so it could not directly optimize accuracy. Instead, it optimized a heuristic that acted as a proxy for accuracy. Two possible heuristics (trajectory smoothness and mean confidence score, both of which assume that the image data is organized as a temporally ordered sequence) were utilized. Increased scale augmentation does improve performance, but not as much as scale optimization using heuristics at test time. Furthermore, it also shows that although mean confidence score is perhaps the more intuitive proxy for accuracy, optimizing trajectory smoothness actually performed better.

Scale optimization was performed at test time using 1-D hierarchical grid search with two levels. First, the objective was computed over a coarse range of scales, and then over a finer range of scales centered on the optimal value from the previous level. A single optimal scale was selected for all frames in a particular video. Two different objective functions were utilized: mean confidence and mean speed (a proxy for smoothness), both computed over the entire video.

Even in scenarios in which the detector performed well, occasional errors occurred. In principle, as long as errors represent a small fraction of overall detections, combining information from multiple frames over time could allow many of those errors to be detected and removed. Thus, a two-step approach to handling failures was developed. In the first step, the raw trajectories produced by the neural network were analyzed and outlier regions were detected. In the second step, outlier regions were filled in using interpolation. A one-dimensional CNN was trained on synthetic noisy data where outlier regions were known. Then, the CNN was applied to real trajectories produced by the GlowTrack neural network. Surprisingly, training on synthetic data alone was sufficient to produce reasonably accurate outlier detection.

Outlier detection was performed using a 1D UNet CNN trained on synthetic data. Synthetic data was generated by randomly sampling smooth two-dimensional (2D) trajectories, adding both temporally correlated and uncorrelated noise, and labeling regions with error greater than a threshold as outliers. The smooth random 2D trajectories were generated using sums of random Gaussian functions. The x and y coordinates were not sampled completely independently: rather, their respective included one Gaussian function with the same variance and mean offset by a random value. In this way, the two coordinates were weakly correlated but also offset in time, as observed empirically in rodent reach trajectories. The 1D CNN was trained on 1,000 synthetic trajectories for 100 epochs, using stochastic gradient descent (SGD) with a learning rate of 0.1, with a negative log-likelihood loss and outlier loss weighted 10 times higher than inlier.

After outlier detection was applied, outlier regions were interpolated using spline interpolation from the Python package "scipy". For experiments involving the Viterbi algorithm, the implementation from the Python package "Anipose" was used.

Figure 12A:
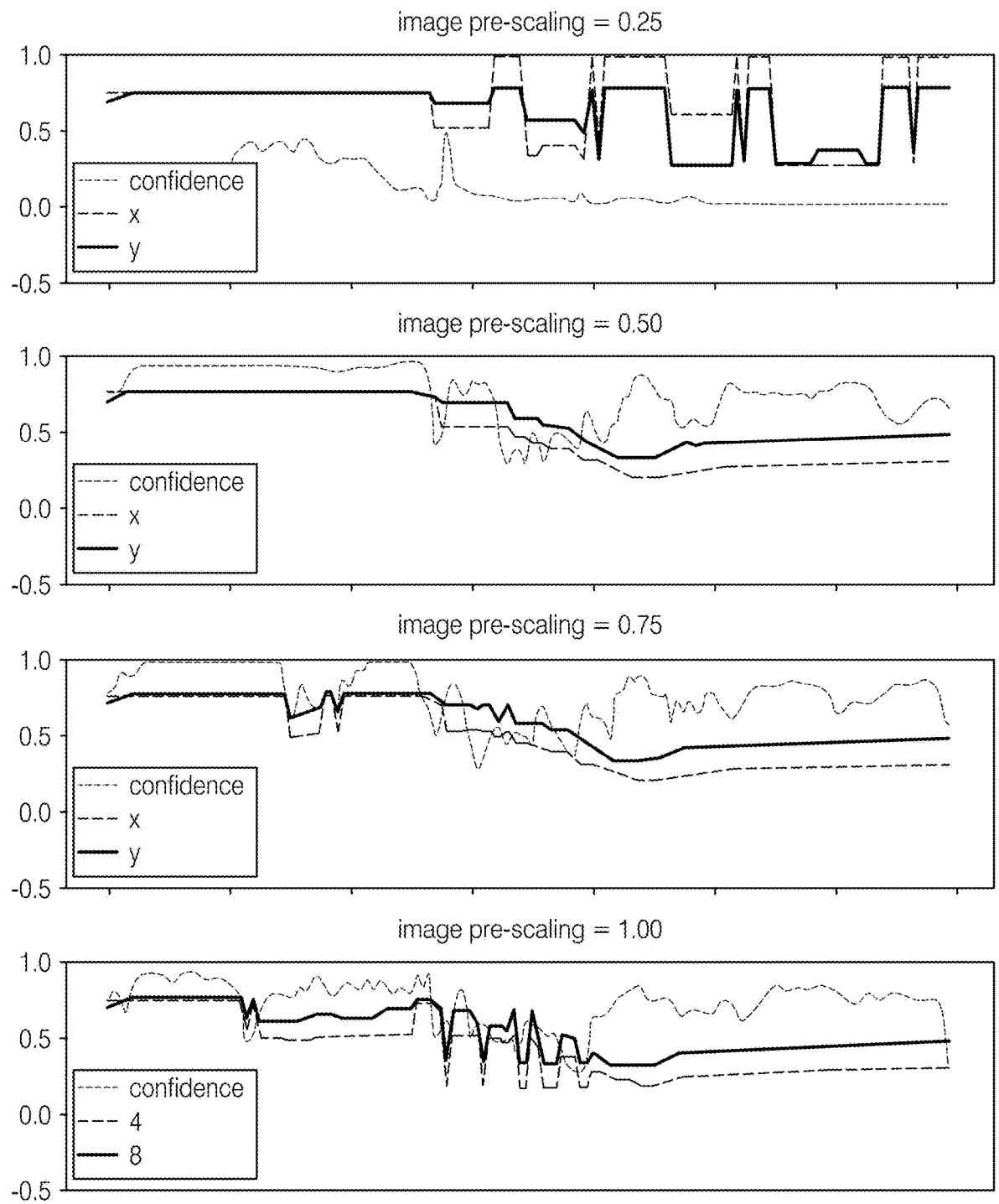
FIG. 12A shows an example of confidences associated with a variety of image pre-scaling factors, in accordance with various embodiments.
Figure 12B:
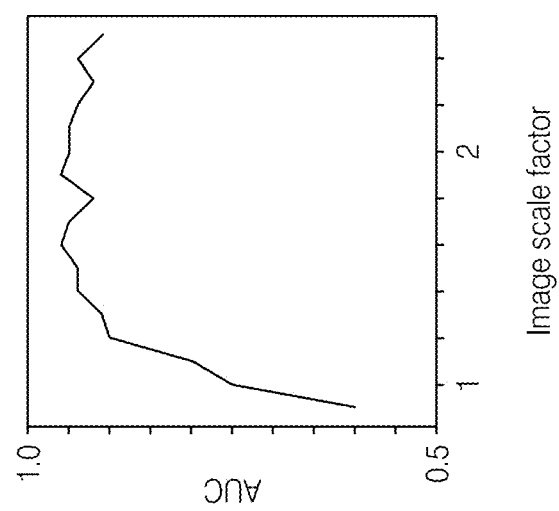
FIG. 12B shows an example of areas under the curve (AUCs) associated with a variety of scaling factors, in accordance with various embodiments.

FIG. 12A shows confidences associated with a variety of image pre-scaling factors. FIG. 12B shows AUCs associated with a variety of scaling factors. As shown in FIG. 12B, the AUC is generally maximized for a scaling factor above approximately 1.5.

Example 9

Parallel Labeling

In the serial labeling approach, only one landmark label is generated per image. By contrast, in the parallel labeling approach, local regions receive distinctive visual barcodes that can be tracked in parallel, yielding many labels per image. In the implementation described herein, tracking is performed with the scale-invariant feature transform (SIFT), a computer vision technique for finding distinctive key points (features), computing visual descriptors for each, and matching features between images.

Several methods were tested for generating random visual barcodes: applying fluorescent powder suspended in transparent adhesive, applying liquid dye with an airbrush, and applying liquid dye by agitating the bristles of a brush to produce a fine aerosol. The brush aerosol approach was most effective because of the scale and uniformity of speckle it produced. The powder adhesive approach also produced a uniform speckle pattern, but the fine spatial scale of the speckle relative to the size of the hand may have required higher resolution imagery. Thus, the brush aerosol approach was adopted for the work described herein.

To validate the parallel labeling approach, a video data set of the human hand was collected. Dye was applied to the hand using the brush aerosol method and video was captured using the video rig described herein with respect to Example 2. The data set contained 12,000 frames captured at a rate of 10 image pairs per second. In addition, 500 frames of video were captured with a different camera and lighting setup to be used as test data.

Matching SIFT features between pairs of UV images produced many correct matches, but also produced some spurious matches. Thus, a spatial-coherency heuristic was applied to filter out bad matches. Consider a pair of images containing, respectively, features f1 and f2 that are a putative match. For this match to be good, f2 should have at least k neighbors (within ε pixels) that were themselves successfully matched to neighbors (within δ pixels) of f1. For the work reported here, k was set equal to 2, and ε and δ were set equal to 50 pixels.

After computing raw SIFT features, additional processing was necessary in order to produce landmark labels that can be used as training data for a neural network. Several different ways of performing this step were tested.

The simplest scheme was to select a subset of the raw SIFT features from a template frame to act as landmarks. Landmark labels were then generated for each frame simply by matching the template SIFT features to the SIFT features in the target frame. Features that matched successfully received an (x, y) label, while those that did not were marked as "hidden."

While SIFT matching with spatial coherency filtering produced very few false positives, it did produce a significant number of false negatives: a particular feature may fail to match in many of frames in which it is visible. Neural networks trained on landmarks derived directly from raw SIFT features failed to converge, possibly due to the large number of erroneous hidden labels. Thus, to deal with failures of SIFT matching, two other schemes for generating training labels were developed. These schemes both pooled SIFT features together into local neighborhoods to provide resiliency to failed matches. The first scheme, referred to as "manual neighborhood selection," involves a modest amount of manual annotation; the second, referred to as "automatic neighborhood selection," is fully automated.

In manual neighborhood selection, the user selects a template image from the training set and manually draws a set of neighborhoods over it, each representing a single landmark to track. For this step Adobe Illustrator was used to draw a mask over each of the twelve segments of the fingers. The SIFT features within each segment then acted as pooled template features for one landmark. These features voted on the location of their landmark in each training image by computing SIFT matches and then computing the centroid of all successful matches. In this way, the impact of false negatives was greatly reduced; as long as a few true positives were present, the centroid of the segment was estimated accurately. Other voting schemes besides the centroid are also possible.

To further increase the reliability of matching, finger segments were labeled in not just one but ten template images. These template images made up the template atlas, because the was is for them to jointly cover the surface of the target object. Some images from the training set were better candidates for inclusion in the atlas: specifically, images that contained more matchable SIFT features. Furthermore, a good atlas should have low redundancy: if a portion of the surface of the target object was well-matched by one atlas image, then the other candidate atlas images should be rewarded less for covering that region. These desiderata were used to create a greedy algorithm for ranking all training images by their suitability for inclusion in the atlas, such that the nth image in the ranked list would have high SIFT coverage of the whole training set but low redundancy with the previous n-1 images. The final ten atlas images were manually selected from the top images in this ranked list. Each additional atlas image indeed helped to reduce the number of false negatives when computing labels for the training set.

A neural network was trained on labels generated with the manual neighborhood selection. When evaluated against manually-labeled data from the held-out test set, this network achieved an AUC of 0.85 and a median pixel error of 34.20.

Labeling the finger segments in the atlas images required about 30 minutes of labor, and landmark labels could then be computed automatically for all 12,000 images in the training set using SIFT matching. However, the amount of manual labor required for this approach scales linearly with the number of segments (i.e., the number of landmarks). Therefore, a fully automated method that could be scaled up to a practically arbitrary number of landmarks was developed.

In "automatic neighborhood selection," the local neighborhoods over which SIFT matches are pooled could be computed automatically as all features within a certain radius of a template feature in a template image. Landmark labels could be computed as follows: as before, if a template feature matched a particular training image, then the match location was used as the landmark label. However, if the feature failed to match but at least k other features in its local neighborhood match successfully, then the neighborhood matches were used to fit a local homography and project the template feature into the target image; the projected location was used as the landmark label. This scheme greatly increased the percentage of features matched from template to target image, from 7.60% to 51.67%.

A neural network was trained on 50 landmarks generated with the automatic neighborhood selection. Evaluation of automatically selected landmarks is challenging because of the large number of landmarks and because a human annotator cannot be given a simple English-language description of each landmark to label. Therefore, only a subset of the landmarks was evaluated: three landmarks on the first digit corresponding to the three segments of the finger. For each segment, a single landmark was selected from among the 50 unnamed landmarks, to act as a proxy: specifically, the landmark closest to a manual label of that segment's location. This evaluation yielded an AUC of 0.76 and a mean pixel error of 29.13.

Besides using the speckle pattern to produce labels, it can also be used to segment the object of interest from the background. With accurate segmentation, the training set can be augmented by replacing the background with different random images. In the work described herein, the random images were generated from a complex noise distribution, but they could alternatively be sampled from a set of natural images. This type of augmentation improved the accuracy and robustness of the resulting landmark detection networks.

Figure 13A:
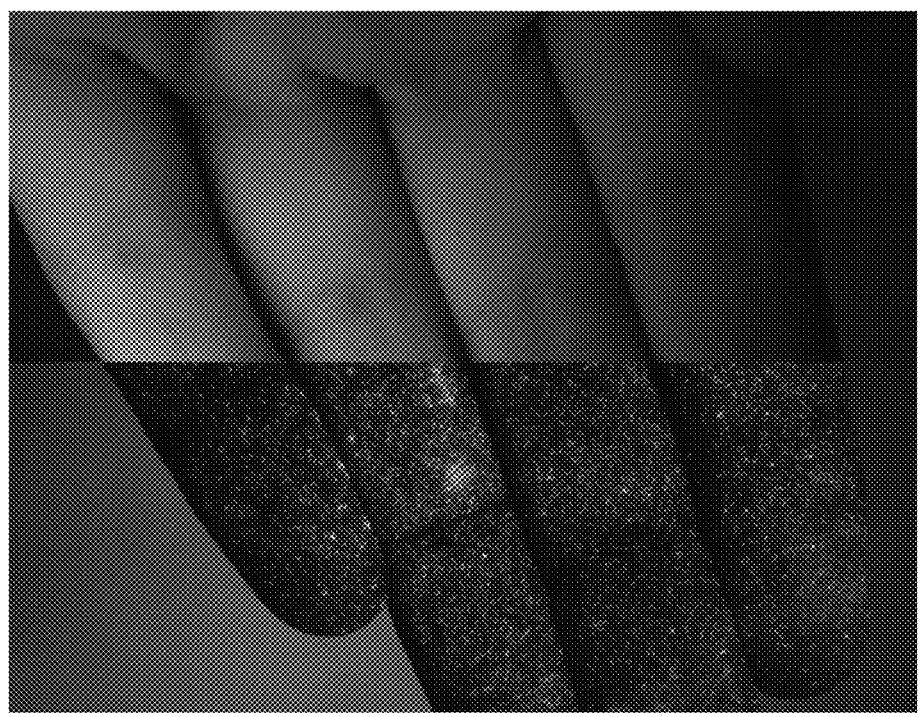
FIG. 13A shows an example of a cutaway image showing an object coated in fluorescent sparkle and imaged under visible and UV illumination, in accordance with various embodiments.

FIG. 13A shows a cutaway image showing an object coated in fluorescent sparkle and imaged under visible (top) and UV (bottom) illumination. The visible and UV images were captured approximately 5 ms apart. As shown in FIG. 13A, the speckle pattern produces a large number of highly distinctive local barcodes.

Figure 13B:
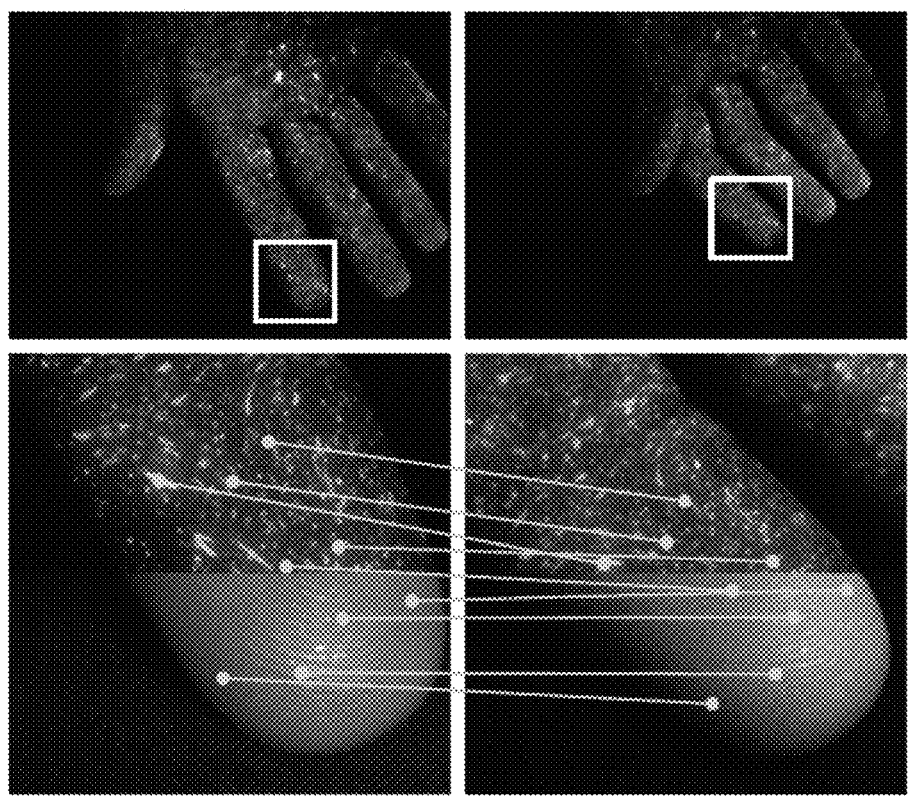
FIG. 13B shows an example of results of a scale-invariant feature transform (SIFT) feature matching algorithm performed on a pair of UV images, in accordance with various embodiments.

FIG. 13B shows results of a SFIT feature matching algorithm performed on a pair of UV images. Only 10% of the matches are shown for clarity.

Figure 13D:
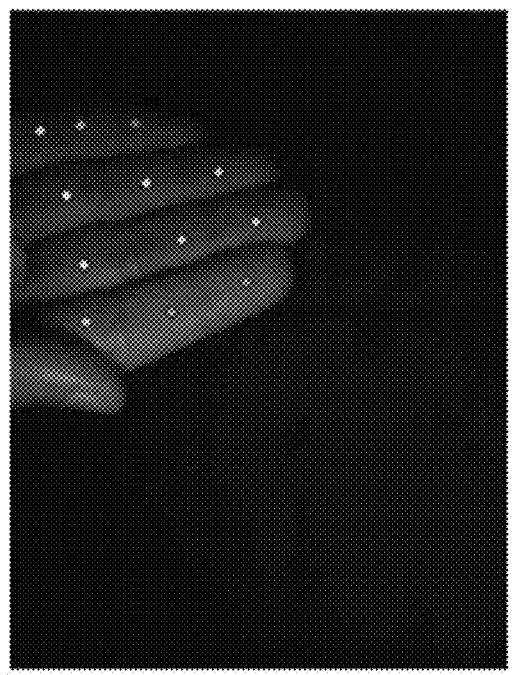
FIG. 13D shows an example of a target image labeled using the manual neighborhood selection procedure, in accordance with various embodiments.
Figure 13C:
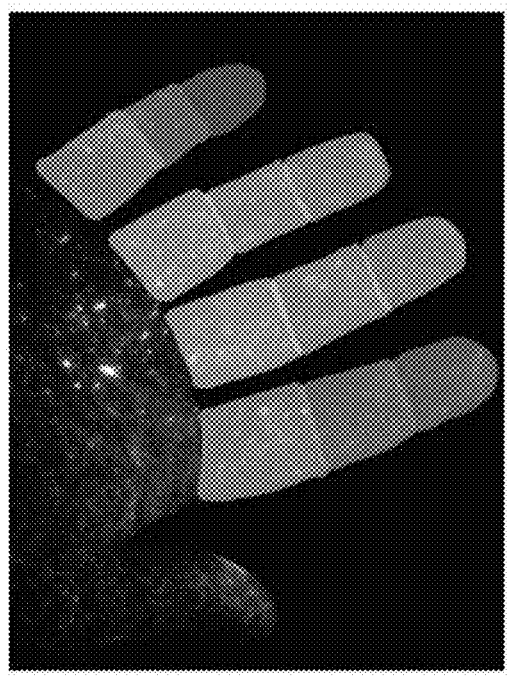
FIG. 13C shows an example of a template image labeled using a manual neighborhood selection procedure, in accordance with various embodiments.
Figure 13F:
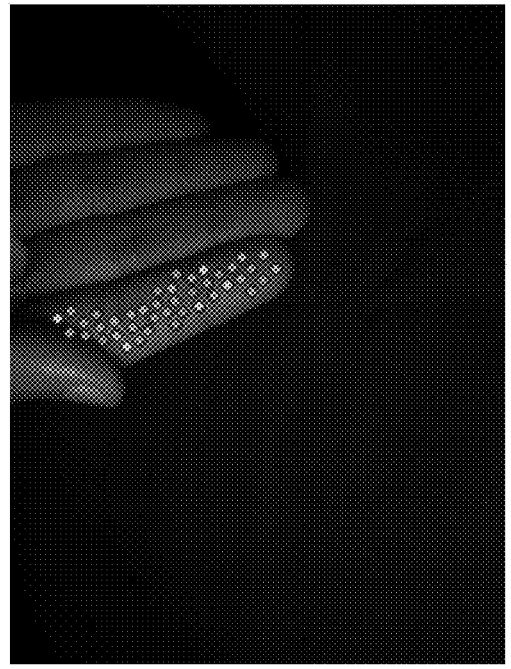
FIG. 13F shows an example of a target image labeled using the automatic neighborhood selection procedure, in accordance with various embodiments.
Figure 13E:
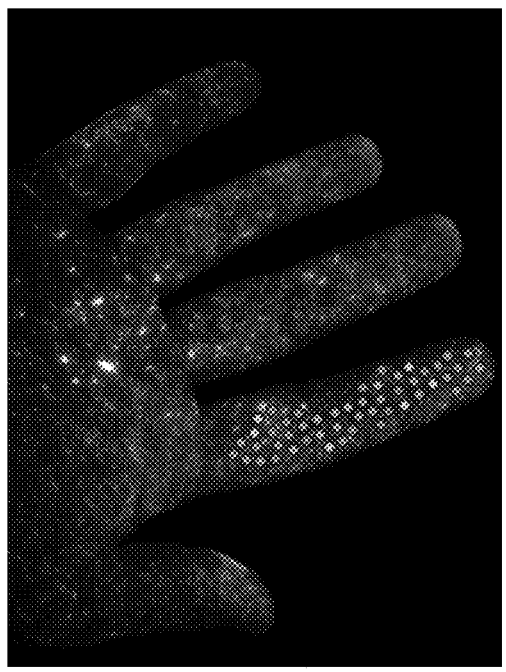
FIG. 13E shows an example of a template image labeled using an automatic neighborhood selection procedure, in accordance with various embodiments.

FIG. 13C shows an example of a template image labeled using a manual neighborhood selection procedure, in accordance with various embodiments. FIG. 13D shows an example of a target image labeled using a manual neighborhood selection procedure, in accordance with various embodiments. FIG. 13E shows an example of a template image labeled using an automatic neighborhood selection procedure, in accordance with various embodiments. FIG. 13F shows an example of a target image labeled using an automatic neighborhood selection procedure, in accordance with various embodiments. As shown in FIGS. 13C-13F, the automatic neighborhood selection procedure yields a large number of SIFT features per image.

Figure 13G:
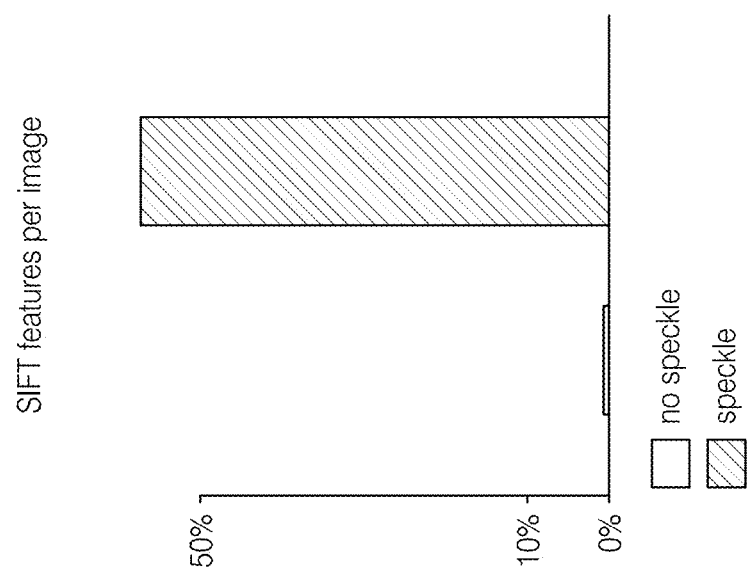
FIG. 13G shows an example of the number of SIFT features extracted from objects featuring fluorescent speckle and no fluorescent speckle, in accordance with various embodiments.

FIG. 13G shows the number of SIFT features extracted from objects featuring fluorescent speckle and no fluorescent speckle. As shown in FIG. 13G, fluorescent speckle greatly increases the number of SIFT features and template matches.

Figures 13H, 13I:
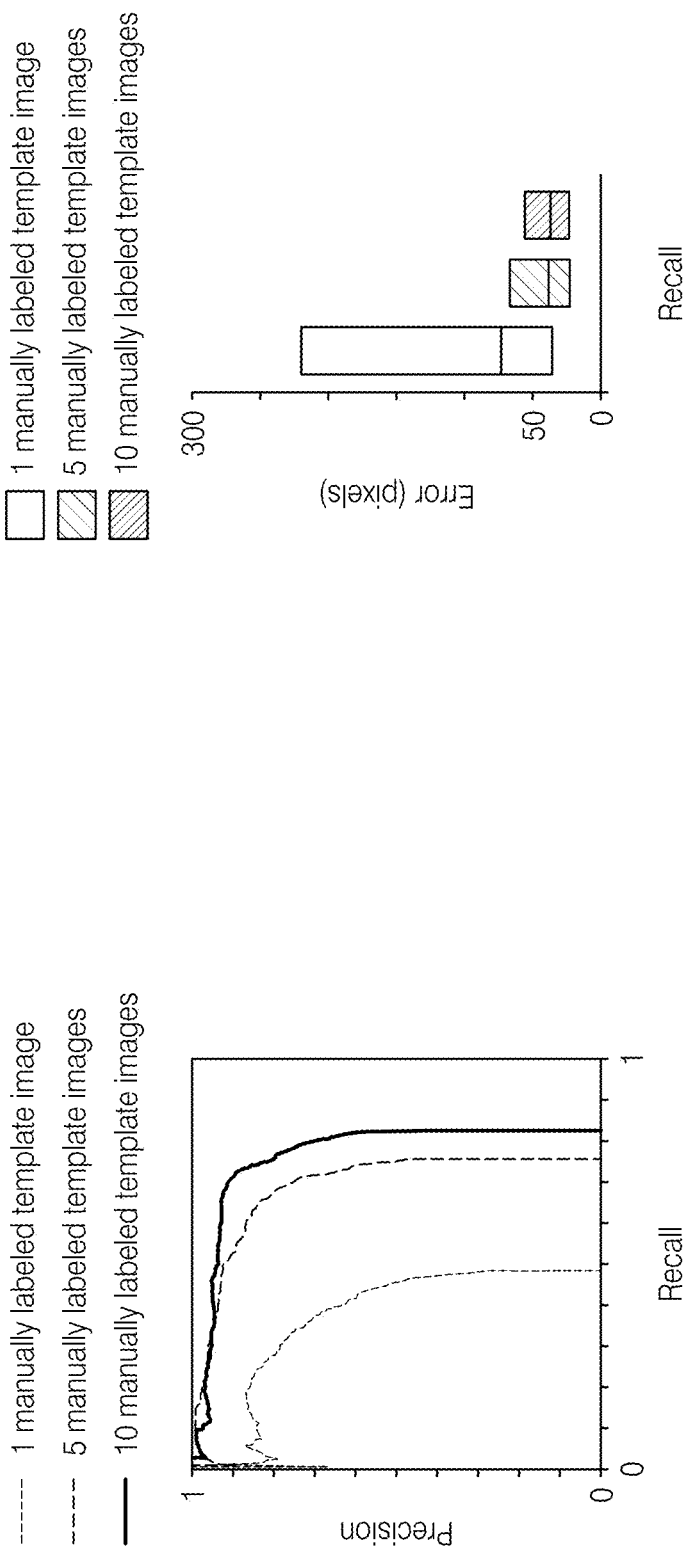
FIG. 13H shows an example of precision-recall curves associated with neural networks trained on 1, 5, or 10 template images using a manual neighborhood selection procedure, in accordance with various embodiments.
FIG. 13I shows an example of mean pixel errors associated with the neural networks trained on the 1, 5, or 10 template images using the manual neighborhood selection procedure, in accordance with various embodiments.

FIG. 13H shows precision-recall curves associated with neural networks trained on 1, 5, or 10 template images using a manual neighborhood selection procedure, in accordance with various embodiments. FIG. 13I shows mean pixel errors associated with the neural networks trained on the 1, 5, or 10 template images using a manual neighborhood selection procedure, in accordance with various embodiments. As shown in FIG. 13H, the use of larger numbers of template images generally improved precision and recall. As shown in FIG. 13I, the use of larger numbers of template images generally improved mean pixel error.

Figure 14B:
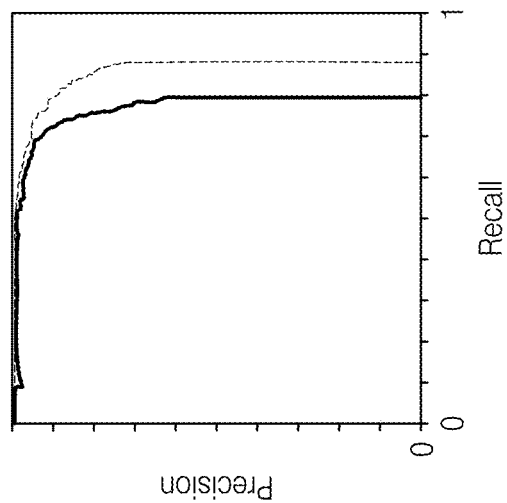
FIG. 14B shows an example of precision-recall curves for the manual neighborhood selection method and the automatic neighborhood selection method, in accordance with various embodiments.
Figure 14A:
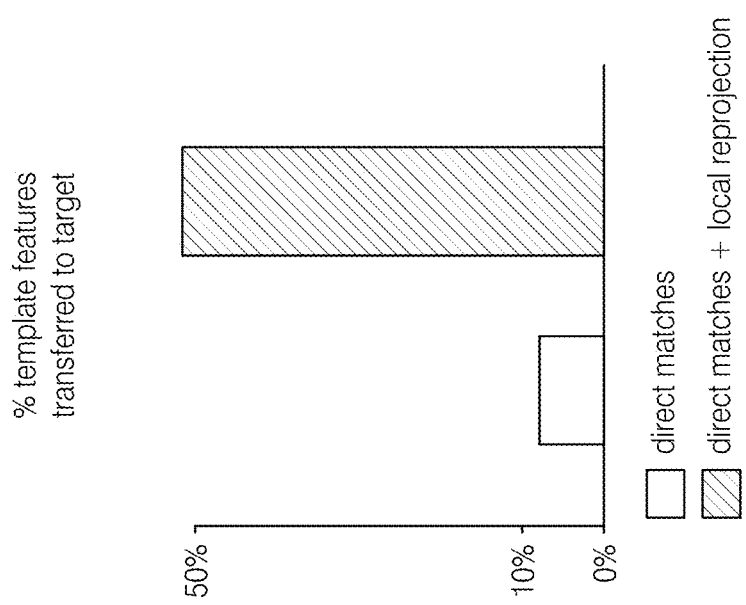
FIG. 14A shows an example of the percentage of features transferred from template image to target image, in accordance with various embodiments.

FIG. 14A shows the percentage of features transferred from template image to target image. In light gray, only features in the template image for which there was a direct feature match in the target image were transferred. In dark gray, direct feature matches were transferred as well as features for which the local neighborhood had at least K direct matches, in which case a homography was fit to the neighborhood matches, and that homography was used to reproject the feature from template to target.

FIG. 14B shows precision-recall curves for a manual neighborhood selection method and an automatic neighborhood selection method, in accordance with various embodiments.

Figure 14C:
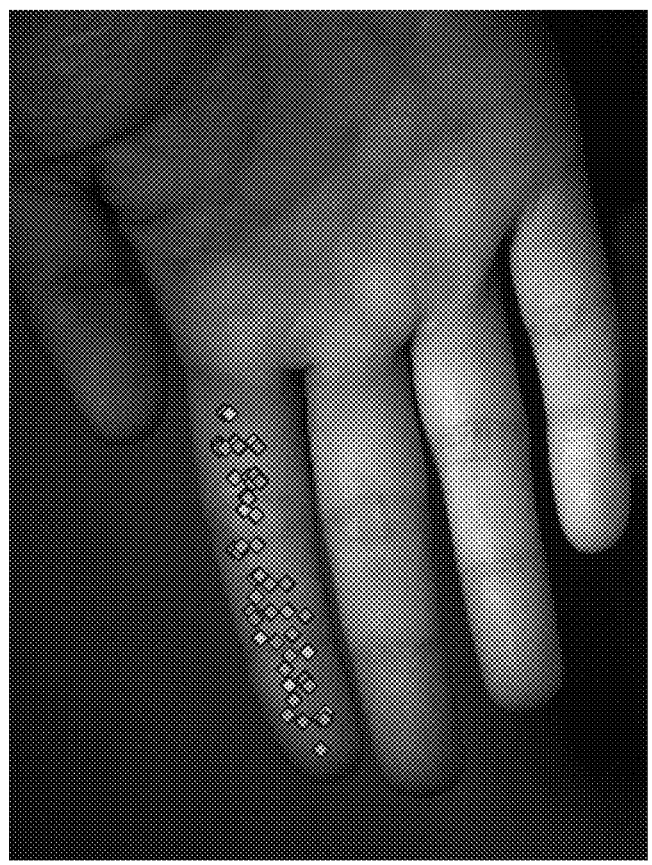
FIG. 14C shows an example image with labels produced by a neural network trained using the automatic neighborhood selection method, in accordance with various embodiments.

FIG. 14C shows an example image with labels produced by a neural network trained using an automatic neighborhood selection method, in accordance with various embodiments.

In describing the various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments Similarly, any of the various system embodiments may have been presented as a group of particular components. However, these systems should not be limited to the particular set of components, now their specific configuration, communication and physical orientation with respect to each other. One skilled in the art should readily appreciate that these components can have various configurations and physical orientations (e.g., wholly separate components, units and subunits of groups of components, different communication regimes between components).

Although specific embodiments and applications of the disclosure have been described in this specification, these embodiments and applications are exemplary only, and many variations are possible.

Recitation Of Embodiments

Embodiment 1. A method comprising:
a. obtaining a first plurality of images of at least one subject using a first imaging modality, the first plurality of images comprising at least one parameter, the subject having at least one imaging label associated therewith;
b. obtaining a second plurality of images of the at least one subject using a second imaging modality different from the first imaging modality; and
c. generating a plurality of labeled images for use in a supervised machine learning (ML) operation using the at least one parameter.

Embodiment 2. The method of Embodiment 1, wherein the at least one subject comprises at least one animal.

Embodiment 3. The method of Embodiment 1 or Embodiment 2, wherein the at least one imaging label comprises at least one fluorescent imaging label.

Embodiment 4. The method of any one of Embodiments 1-3, wherein the at least one imaging label comprises a plurality of imaging labels.

Embodiment 5. The method of Embodiment 4, wherein the plurality of imaging labels are associated with a plurality of physiological locations on the subject.

Embodiment 6. The method of any one of Embodiments 1-5, further comprising associating the at least one imaging label with the at least one subject.

Embodiment 7. The method of any one of Embodiments 1-6, wherein the first imaging modality comprises a fluorescence imaging modality.

Embodiment 8. The method of any one of Embodiments 1-7, wherein the second imaging modality comprises a visible light imaging modality.

Embodiment 9. The method of Embodiment 8, wherein the visible light imaging modality comprises a brightfield imaging modality.

Embodiment 10. The method of any one of Embodiments 1-9, wherein the first plurality of images and the second plurality of images are obtained in an interlaced manner.

Embodiment 11. The method of any one of Embodiments 1-10, wherein the at least one parameter comprises a region of interest on the subject.

Embodiment 12. The method of any one of Embodiments 1-11, further comprising computing a centroid for each of the first plurality of images.

Embodiment 13. The method of any one of Embodiments 1-12, further comprising performing one or more data augmentation operations to the plurality of labeled images.

Embodiment 14. The method of Embodiment 13, wherein the one or more data augmentation operations are selected from the group consisting of: blurring, Gaussian blurring, contrast scaling, random contrast scaling, additive noise addition, Gaussian additive noise addition, channel scaling, random channel scaling, cropping, random cropping, affine warping, random affine warping, grayscale conversion, and probabilistic grayscale conversion.

Embodiment 15. The method of any one of Embodiments 1-14, further comprising training the supervised ML operation using the plurality of labeled images.

Embodiment 16. The method of any one of Embodiments 1-15, wherein the plurality of labeled images is generated at a rate of at least 1 labeled image per second.

Embodiment 17. The method of any one of Embodiments 1-16, further comprising applying the supervised ML operation to a third plurality of images.

Embodiment 18. A system comprising:
a. a first imaging module configured to obtain a first plurality of images of at least one subject using a first imaging modality, the subject having at least one imaging label associated therewith;
b. a second imaging module configured to obtain a second plurality of images of the at least one subject using a second imaging modality different from the first imaging modality; and
c. a label-generating module configured to generate a plurality of labeled images for use in a supervised ML operation using the at least one parameter.

Embodiment 19. The system of Embodiment 18, wherein the label-generating module comprises:
i. one or more processors; and
ii. a memory coupled to the one or more processors and configured to provide the one or more processors with instructions that, when executed, cause the one or more processors to generate the plurality of labeled images for use in the supervised ML operation.

Embodiment 20. The system of Embodiment 18, wherein the label-generating module comprises:
i. one or more processors configured to generate the plurality of labeled images for use in the supervised ML operation; and
ii. a memory coupled to the one or more processors and configured to provide the processor with instructions to generate the plurality of labeled images.

Embodiment 21. The system of any one of Embodiments 18-20, wherein the at least one subject comprises at least one animal.

Embodiment 22. The system of any one of Embodiments 18-21, wherein the at least one imaging label comprises at least one fluorescent imaging label.

Embodiment 23. The system of any one of Embodiments 18-22, wherein the at least one imaging label comprises a plurality of imaging labels.

Embodiment 24. The system of Embodiment 23, wherein the plurality of imaging labels are associated with a plurality of physiological locations on the subject.

Embodiment 25. The system of any one of Embodiments 18-24, wherein the label generating module is configured to associate the at least one imaging label with the at least one subject.

Embodiment 26. The system of any one of Embodiments 18-25, wherein the first imaging modality comprises a fluorescence imaging modality.

Embodiment 27. The system of any one of Embodiments 18-26, wherein the second imaging modality comprises a visible light imaging modality.

Embodiment 28. The system of Embodiment 27, wherein the visible light imaging modality comprises a brightfield imaging modality.

Embodiment 29. The system of any one of Embodiments 18-28, wherein the first plurality of images and the second plurality of images are obtained in an interlaced manner.

Embodiment 30. The system of any one of Embodiments 18-29, wherein the at least one parameter comprises a region of interest on the subject.

Embodiment 31. The system of any one of Embodiments 18-30, wherein the label-generating module is configured to compute a centroid for each of the first plurality of images.

Embodiment 32. The system of any one of Embodiments 18-31, wherein the label-generating module is configured to perform one or more data augmentation operations to the plurality of labeled images.

Embodiment 33. The system of Embodiment 32, wherein the one or more data augmentation operations are selected from the group consisting of: blurring, Gaussian blurring, contrast scaling, random contrast scaling, additive noise addition, Gaussian additive noise addition, channel scaling, random channel scaling, cropping, random cropping, affine warping, random affine warping, grayscale conversion, and probabilistic grayscale conversion.

Embodiment 34. The system of any one of Embodiments 18-33, further comprising a training module configured to train the supervised ML operation using the plurality of labeled images.

Embodiment 35. The system of any one of Embodiments 18-34, wherein the plurality of labeled images is generated at a rate of at least 1 labeled image per second.

Embodiment 36. The system of any one of Embodiments 18-35, further comprising an inference module configured to apply the supervised ML operation to a third plurality of images.

Embodiment 37. A non-transitory computer-readable medium storing computer instructions that, when executed by a computer, cause the computer to perform a method comprising:
  a. obtaining a first plurality of images of at least one subject using a first imaging modality, the first plurality of images comprising at least one parameter, the subject having at least one imaging label associated therewith;
  b. obtaining a second plurality of images of the at least one subject using a second imaging modality different from the first imaging modality; and
  c. generating a plurality of labeled images for use in a supervised machine learning (ML) operation using the at least one parameter.

Embodiment 38. The non-transitory computer-readable medium of Embodiment 37, wherein the at least one subject comprises at least one animal.

Embodiment 39. The non-transitory computer-readable medium of Embodiment 37 or Embodiment 38, wherein the at least one imaging label comprises at least one fluorescent imaging label.

Embodiment 40. The non-transitory computer-readable medium of any one of Embodiments 37-39, wherein the at least one imaging label comprises a plurality of imaging labels.

Embodiment 41. The non-transitory computer-readable medium of Embodiment 40, wherein the plurality of imaging labels are associated with a plurality of physiological locations on the subject.

Embodiment 42. The non-transitory computer-readable medium of any one of Embodiments 37-41, wherein the method further comprises associating the at least one imaging label with the at least one subject.

Embodiment 43. The non-transitory computer-readable medium of any one of Embodiments 37-42, wherein the first imaging modality comprises a fluorescence imaging modality.

Embodiment 44. The non-transitory computer-readable medium of any one of Embodiments 37-43, wherein the second imaging modality comprises a visible light imaging modality.

Embodiment 45. The non-transitory computer-readable medium of Embodiment 44, wherein the visible light imaging modality comprises a brightfield imaging modality.

Embodiment 46. The non-transitory computer-readable medium of any one of Embodiments 37-45, wherein the first plurality of images and the second plurality of images are obtained in an interlaced manner.

Embodiment 47. The non-transitory computer-readable medium of any one of Embodiments 37-46, wherein the at least one parameter comprises a region of interest on the subject.

Embodiment 48. The non-transitory computer-readable medium of any one of Embodiments 37-47, wherein the method further comprises computing a centroid for each of the first plurality of images.

Embodiment 49. The non-transitory computer-readable medium of any one of Embodiments 37-48, wherein the method further comprises performing one or more data augmentation operations to the plurality of labeled images.

Embodiment 50. The non-transitory computer-readable medium of Embodiment 49, wherein the one or more data augmentation operations are selected from the group consisting of: blurring, Gaussian blurring, contrast scaling, random contrast scaling, additive noise addition, Gaussian additive noise addition, channel scaling, random channel scaling, cropping, random cropping, affine warping, random affine warping, grayscale conversion, and probabilistic grayscale conversion.

Embodiment 51. The non-transitory computer-readable medium of any one of Embodiments 37-50, wherein the method further comprises training the supervised ML operation using the plurality of labeled images.

Embodiment 52. The non-transitory computer-readable medium of any one of Embodiments 37-51, wherein the plurality of labeled images is generated at a rate of at least 1 labeled image per second.

Embodiment 53. The non-transitory computer-readable medium of any one of Embodiments 37-52, wherein the method further comprises applying the supervised ML operation to a third plurality of images.

The invention claimed is:

1. A computer-implemented method comprising:
  obtaining a first plurality of images of at least one subject using a first imaging modality, the first plurality of images comprising at least one parameter, the subject having at least one imaging label associated therewith, wherein the at least one imaging label comprises at least one fluorescent imaging label;
  computing a centroid for each of the first plurality of images by thresholding the at least one fluorescent imaging label and computing a binary mask of each of the first plurality of images;
  obtaining a second plurality of images of the at least one subject using a second imaging modality different from the first imaging modality;
  generating a plurality of labeled images using the at least one parameter and the computed centroids by mapping the computed centroids onto the second plurality of images;
  training a supervised machine learning (ML) operation using the plurality of labeled images; and
  applying the supervised ML operation to a third plurality of images to identify a region of interest within the third plurality of images.

2. The method of claim 1, wherein the at least one subject comprises at least one animal.

3. The method of claim 1, wherein the at least one imaging label comprises a plurality of imaging labels.

4. The method of claim 3, wherein the plurality of imaging labels are associated with a plurality of physiological locations on the subject.

5. The method of claim 1, further comprising associating the at least one imaging label with the at least one subject.

6. The method of any claim 1, wherein the first imaging modality comprises a fluorescence imaging modality.

7. The method of claim 1, wherein the second imaging modality comprises a visible light imaging modality.

8. The method of claim 7, wherein the visible light imaging modality comprises a brightfield imaging modality.

9. The method of claim 1, wherein the first plurality of images and the second plurality of images are obtained in an interlaced manner.

10. The method of claim 1, wherein the at least one parameter comprises a region of interest on the subject.

11. The method of claim 1, further comprising performing one or more data augmentation operations to the plurality of labeled images.

12. The method of claim 11, wherein the one or more data augmentation operations are selected from the group consisting of: blurring, Gaussian blurring, contrast scaling, random contrast scaling, additive noise addition, Gaussian additive noise addition, channel scaling, random channel scaling, cropping, random cropping, affine warping, random affine warping, grayscale conversion, and probabilistic grayscale conversion.

13. The method of claim 1, wherein the plurality of labeled images are generated at a rate of at least 1 labeled image per second.

14. A system comprising:
- a first imaging module configured to obtain a first plurality of images of at least one subject using a first imaging modality, the subject having at least one imaging label associated therewith, wherein the at least one imaging label comprises at least one fluorescent imaging label;
- a second imaging module configured to obtain a second plurality of images of the at least one subject using a second imaging modality different from the first imaging modality;
- one or more processors; and
- a memory coupled to the one or more processors, wherein the memory stores instructions that, when executed, cause the one or more processors to:
  - compute a centroid for each of the first plurality of images by thresholding the at least one fluorescent imaging label and computing a binary mask of each of the first plurality of images;
  - generate a plurality of labeled images using the at least one parameter and the computed centroids by mapping the computed centroids onto the second plurality of images;
  - train a supervised machine learning (ML) operation using the plurality of labeled images; and
  - apply the supervised ML operation to a third plurality of images to identify a region of interest within the third plurality of images.

15. A non-transitory computer-readable medium storing computer instructions that, when executed by a computer, cause the computer to perform a method comprising:
- obtaining a first plurality of images of at least one subject using a first imaging modality, the first plurality of images comprising at least one parameter, the subject having at least one imaging label associated therewith, wherein the at least one imaging label comprises at least one fluorescent imaging label;
- computing a centroid for each of the first plurality of images by thresholding the at least one fluorescent imaging label and computing a binary mask of each of the first plurality of images;
- obtaining a second plurality of images of the at least one subject using a second imaging modality different from the first imaging modality;
- generating a plurality of labeled images using the at least one parameter and the computed centroids by mapping the computed centroids onto the second plurality of images;
- training a supervised machine learning (ML) operation using the plurality of labeled images; and
- applying the supervised ML operation to a third plurality of images to identify a region of interest within the third plurality of images.

* * * * *